United States Patent
Hegna et al.

(10) Patent No.: US 10,317,553 B2
(45) Date of Patent: Jun. 11, 2019

(54) METHODS AND SYSTEMS OF WAVEFIELD SEPARATION APPLIED TO NEAR-CONTINUOUSLY RECORDED WAVEFIELDS

(71) Applicant: PGS Geophysical AS, Oslo (NO)

(72) Inventors: Stian Hegna, Hovik (NO); Gregg Parkes, Corsham (GB)

(73) Assignee: PGS Geophysical AS, Oslo (NO)

( * ) Notice: Subject to any disclaimer, the term of this patent is extended or adjusted under 35 U.S.C. 154(b) by 640 days.

(21) Appl. No.: 14/645,247

(22) Filed: Mar. 11, 2015

(65) Prior Publication Data

US 2016/0047928 A1 Feb. 18, 2016

Related U.S. Application Data

(60) Provisional application No. 62/036,869, filed on Aug. 13, 2014.

(51) Int. Cl.
| | |
|---|---|
| G01V 1/36 | (2006.01) |
| G01V 1/32 | (2006.01) |
| G01V 1/38 | (2006.01) |
| G01V 1/30 | (2006.01) |
| G01V 1/34 | (2006.01) |

(52) U.S. Cl.
CPC .............. *G01V 1/36* (2013.01); *G01V 1/32* (2013.01); *G01V 1/38* (2013.01); *G01V 1/30* (2013.01); *G01V 1/34* (2013.01); *G01V 2210/21* (2013.01); *G01V 2210/44* (2013.01); *G01V 2210/56* (2013.01); *G01V 2210/57* (2013.01); *G01V 2210/64* (2013.01); *G01V 2210/72* (2013.01); *G01V 2210/74* (2013.01)

(58) Field of Classification Search
None
See application file for complete search history.

(56) References Cited

U.S. PATENT DOCUMENTS

| | | | |
|---|---|---|---|
| 6,751,559 B2 | 6/2004 | Fooks et al. | |
| 6,882,938 B2 | 4/2005 | Vaage et al. | |
| 6,906,981 B2 | 6/2005 | Vaage | |
| 7,031,223 B2 | 4/2006 | Kinkead | |
| 7,359,283 B2 | 4/2008 | Vaage et al. | |

(Continued)

FOREIGN PATENT DOCUMENTS

| | | |
|---|---|---|
| EP | 2 259 091 A2 | 12/2010 |
| GB | 2522778 A | 8/2015 |

(Continued)

OTHER PUBLICATIONS

Search Report, Application No. GB1514335.7, dated Jan. 5, 2016.

(Continued)

*Primary Examiner* — Tung S Lau

(57) ABSTRACT

Wavefield separation methods and systems that adjust near-continuous pressure and particle motion wavefields based on distance moved along a vessel track by the sensors when the wavefields were measured are disclosed. Methods and systems correct for the motion of the receivers in towed streamer seismic data in order to obtain a wavefield with approximately stationary-receiver locations. Wavefield separation may then be applied to the wavefield with approximately stationary-receiver locations.

22 Claims, 25 Drawing Sheets

(56) References Cited

U.S. PATENT DOCUMENTS

| | | | |
|---|---|---|---|
| 7,391,673 | B2 | 6/2008 | Regone et al. |
| 7,502,690 | B2 | 3/2009 | Thomsen et al. |
| 7,869,303 | B2 | 1/2011 | Kinkead |
| 7,916,576 | B2 | 3/2011 | Beasley et al. |
| 7,941,273 | B2 | 5/2011 | Thomsen et al. |
| 8,218,393 | B2 | 7/2012 | Beasley |
| 8,295,124 | B2 | 10/2012 | Abma |
| 8,299,794 | B2 | 10/2012 | Farrelly et al. |
| 8,345,510 | B2 | 1/2013 | Hegna et al. |
| 8,395,966 | B2 | 3/2013 | Moore et al. |
| 8,427,901 | B2 | 4/2013 | Lunde et al. |
| 8,559,270 | B2 | 10/2013 | Abma |
| 8,588,025 | B2 | 11/2013 | Moldoveanu et al. |
| 8,596,409 | B2 | 12/2013 | Parkes et al. |
| 8,730,760 | B2 | 5/2014 | Cambois et al. |
| 2006/0291328 | A1* | 12/2006 | Robertsson ............ G01V 1/36 367/24 |
| 2008/0019214 | A1 | 1/2008 | Pramik |
| 2009/0323472 | A1 | 12/2009 | Howe |
| 2009/0326895 | A1 | 12/2009 | Beasley |
| 2010/0039888 | A1* | 2/2010 | Ozdemir ................. G01V 1/36 367/13 |
| 2010/0302900 | A1 | 12/2010 | Tenghamn |
| 2011/0079461 | A1 | 4/2011 | Allen et al. |
| 2011/0141850 | A1 | 6/2011 | Scott et al. |
| 2012/0033525 | A1 | 2/2012 | Abma et al. |
| 2012/0033526 | A1 | 2/2012 | Hegna et al. |
| 2012/0113747 | A1 | 5/2012 | Ferber |
| 2012/0147699 | A1 | 6/2012 | Dellinger et al. |
| 2012/0147701 | A1 | 6/2012 | Ross et al. |
| 2012/0155217 | A1 | 6/2012 | Dellinger et al. |
| 2012/0155218 | A1 | 6/2012 | Beasley et al. |
| 2012/0176861 | A1 | 7/2012 | Abma et al. |
| 2013/0028051 | A1 | 1/2013 | Barkved et al. |
| 2013/0088235 | A1 | 4/2013 | Hegna et al. |
| 2013/0088938 | A1 | 4/2013 | Aaron et al. |
| 2013/0121109 | A1 | 5/2013 | Baardman et al. |
| 2013/0322205 | A1 | 12/2013 | Widmaier et al. |
| 2014/0140168 | A1 | 5/2014 | Howe |

FOREIGN PATENT DOCUMENTS

| | | |
|---|---|---|
| GB | 2524656 A | 9/2015 |
| GB | 2530126 A | 3/2016 |
| WO | 2015/158620 A1 | 10/2015 |

OTHER PUBLICATIONS

Search Report, Application No. GB1602620.5, dated Jun. 24, 2016.

Akerberg, Peeter et al., "Simultaneous source separation by sparse Radon transform", SEG Las Vegas 2008 Annual Meeting, pp. 2801-2805.

Spitz, Simon, et al., "Simultaneous source separation: a prediction-subtraction approach", SEG Las Vegas 2008 Annual Meeting, pp. 28112815.

Howe, Dave, et al., "Indepedent Simultaneous Sweeping in Libya—full scale implementation and new developments", SEG Houston 2009 International Exposition and Annual Meeting, pp. 109-111.

Jiang, Zhiyong and Ray Abma, "An analysis on the simultaneous imaging of simultaneous source data", SEG Denver 2010 Annual Meeting, pp. 3115-3119.

Abma, Ray, et al., "An Overview of BP's Marine Independent Simultaneous Source field trials", SEG Las Vegas 2012 Annual Meeting, pp. 1-5.

Zhang, Qie, et al., "A marine node simultaneous source acquisition trial at Atlantis, Gulf of Mexico", SEG Houston 2013 Annual Meeting, pp. 99-103.

Abma, Ray, et al. "Popcorn shooting: Sparse inversion and the distribution of airgun array energy over time", SEG Houston 2013 Annual Meeting, pp. 31-35.

Alexander, Gino, et al., "Processing results of simultaneous source surveys compared to conventional surveys", SEG Houston 2013 Annual Meeting, pp. 104108.

* cited by examiner

METHODS AND SYSTEMS OF WAVEFIELD SEPARATION APPLIED TO NEAR-CONTINUOUSLY RECORDED WAVEFIELDS

CROSS-REFERENCE TO A RELATED APPLICATION

This application claims the benefit of Provisional Application 62/036,869, filed Aug. 13, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged sources. A source may be composed of an array of source elements, such as air guns or marine vibrators. The acoustic signals travel down through the water and into the subterranean formation. At interfaces between different types of rock or sediment of the subterranean formation, a portion of the acoustic signal energy may be refracted, a portion may be transmitted, and a portion may be reflected back toward the formation surface and into the body of water. A typical marine survey is carried out with a survey vessel that passes over the illuminated subterranean formation while towing elongated cable-like structures called streamers. The streamers may be equipped with a number of receivers for detecting and/or measuring seismic energy. Often, the receivers may be collocated pressure and particle motion sensors that detect pressure and particle motion wavefields, respectively, associated with the acoustic signals reflected back into the water from the subterranean formation. The pressure sensors may generate seismic data that represents the pressure wavefield ("pressure data"), and the particle motion sensors may generate seismic data that represents the particle motion, particle velocity, or particle acceleration wavefield ("particle motion data"). Equipment on the survey vessel may receive and record the seismic data generated by the receivers.

A wavefield that travels upward from the subterranean formation and is detected by the pressure or particle motion sensors is called an up-going wavefield, which alone may be used to compute a seismic image of the subterranean formation. However, the surface of the water acts as a nearly perfect acoustic reflector. As a result, the receivers also detect a down-going wavefield created by reflection of the up-going wavefield from the water surface. The down-going wavefield is essentially the up-going wavefield with a time delay that corresponds to the amount of time it takes for acoustic signals to travel up past the streamers to the water surface and back down to the streamers. The down-going wavefield combines with the up-going wavefield, resulting in recorded seismic data contaminated with unwanted down-going wavefield energy that creates "ghost" effects in seismic images of the subterranean formation computed from the seismic data. Wavefield separation techniques compute the up-going wavefield based on pressure and particle motion wavefields.

DETAILED DESCRIPTION

During a marine survey, pressure sensors may generate seismic data that represents the pressure wavefield ("pressure data"), and particle motion sensors may generate seismic data that represents the particle motion, particle velocity, or particle acceleration wavefield ("particle motion data"). Wavefield separation is traditionally applied to pressure and particle motion wavefields recorded after a single activation of a source (such as an air gun or marine vibrator) and is based on the approximation that the sensors were stationary when the wavefields were measured. By contrast, near-continuous pressure and particle motion wavefields may be obtained by near-continuously measuring and recording the pressure and particle motion wavefields over considerably longer periods of time and distances than is typically done for pressure and particle motion wavefields recorded after only a single activation of a source. The resulting seismic data may be a large matrix recorded over much of, up to and including the entirety of, a vessel track for a series of source activations and near-continuous movement of the receivers. The seismic data may be recorded as a single matrix or recorded as separate smaller matrices. For near-continuous measuring and recording of a wavefield, activation times of the source and the source elements comprising the source need not be synchronized. As a result, traditional wavefield separation techniques based on the stationary-receiver approximation cannot be applied to near-continuously recorded wavefields. This disclosure is directed to wavefield separation methods and systems that adjust near-continuously recorded wavefields based on the distances the receivers moved in measuring the wavefields. Methods and systems described below correct for the motion of the receivers in towed streamer seismic data in order to obtain a wavefield with approximately stationary-receiver locations. Wavefield separation may then be applied to the wavefield with approximately stationary-receiver locations.

Figure 1A:
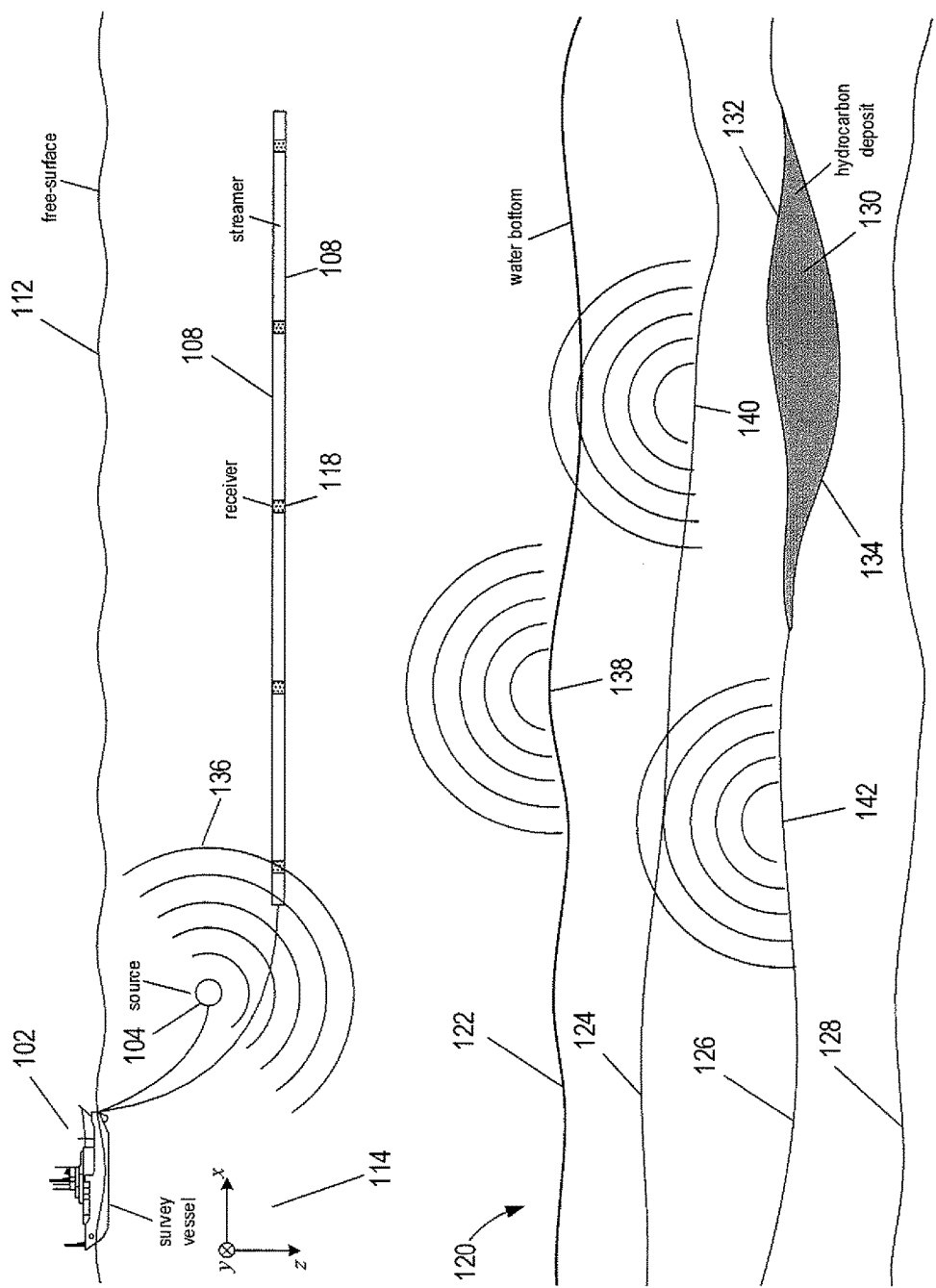
FIGS. 1A-1B show side-elevation and top views of an example seismic data acquisition system.
Figure 1B:
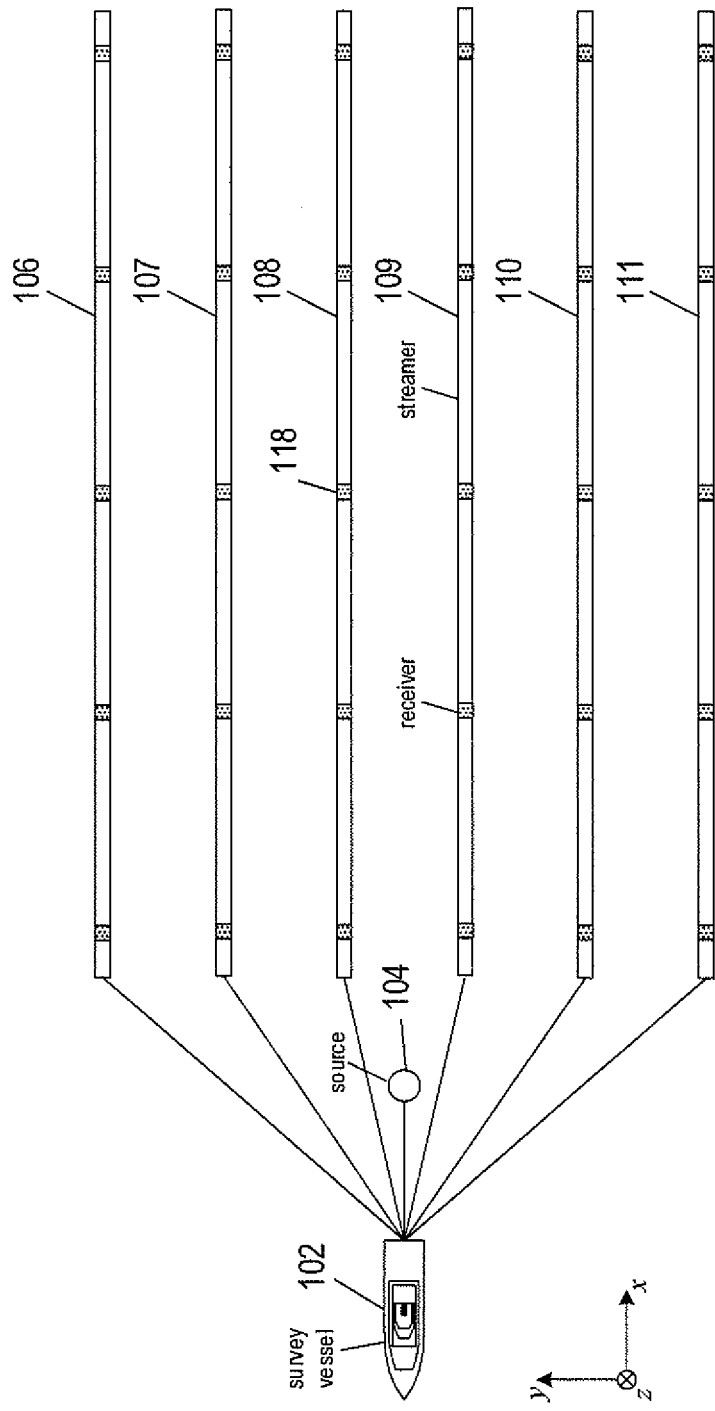

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to recording and data processing equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be estimated, at least in part, by analysis of seismic data collected during a marine seismic survey. As the survey vessel 102 moves over the subterranean formation 120, the source 104 may be activated to produce an acoustic signal at spatial and/or temporal intervals. Activation of the source 104 is often called as a "shot." In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be three-dimensional (e.g., spherical) but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be considered a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
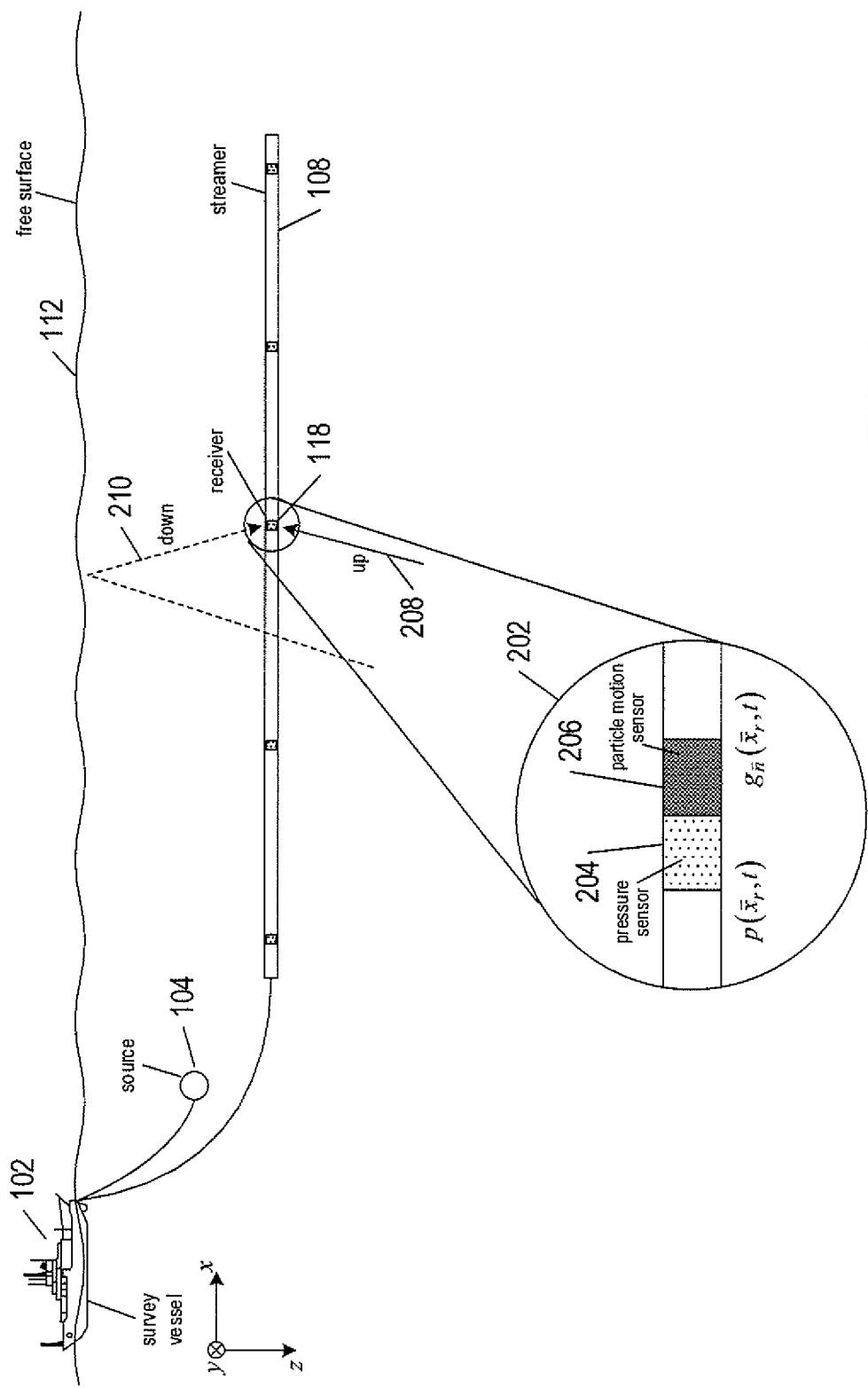
FIG. 2 shows a side-elevation view of seismic data acquisition system with a magnified view of a receiver.

Each receiver 118 may be a multi-component sensor including particle motion sensors and/or a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the seismic data acquisition system with a magnified view 202 of the receiver 118. In this example, the magnified view 202 reveals that the receiver 118 is a multi-component sensor composed of a pressure sensor 204 and a particle motion sensor 206. The pressure sensor may be, for example, a hydrophone. Each pressure sensor may measure changes in water pressure over time to produce pressure data denoted by $p(\vec{x}_r,t)$, where $\vec{x}_r$ represents the Cartesian coordinates $(x_r, y_r, z_r)$ of a receiver, subscript r is a receiver index, and t represents time. The particle motion sensors may be responsive to water motion. In general, particle motion sensors detect particle motion (i.e., displacement, velocity, or acceleration) in a direction normal to the orientation of the particle motion sensor and may be responsive to such directional displacement of the particles, velocity of the particles, or acceleration of the particles. A particle motion sensor that measures particle displacement generates particle-displacement data denoted by $g_{\vec{n}}(\vec{x}_r,t)$, where the vector $\vec{n}$ represents the direction along which particle displacement is measured. A particle motion sensor that measures particle velocity (i.e., particle-velocity sensor) generates particle-velocity data denoted by $v_{\vec{n}}(\vec{x}_r, t)$. A particle motion sensor that measures particle acceleration (i.e., accelerometer) generates particle-acceleration data denoted by $a_{\vec{n}}(\vec{x}_r, t)$. The data generated by one type of particle motion sensor may be converted to another type during seismic data processing. For example, particle-displacement data may be differentiated to obtain particle-velocity data, and particle-acceleration data may be integrated to obtain particle-velocity data. The term "particle motion data" is a general term used to refer to particle-displacement data, particle-velocity data, or particle-acceleration data.

The particle motion sensors are typically oriented so that the particle motion is measured in the vertical direction (i.e., $\vec{n}=(0,0, z)$) in which case $g_{\vec{n}}(\vec{x}^r,t)$ is called vertical displacement data, $v_z(\vec{x}_r,t)$ is called the vertical-particle-velocity data and $a_z(\vec{x}_r,t)$ is called the vertical-particle-acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot n_2 = 0$). In other words, each receiver may include three particle motion sensors that measure particle motion in three orthogonal directions. For example, in addition to having a particle motion sensor that measures particle velocity in the z-direction to give $v_z(\vec{x}_r, t)$, each receiver may include a particle motion sensor that measures the wavefield in the in-line direction in order to obtain the in-line particle-velocity data, $v_x(\vec{x}_r, t)$, and a particle motion sensor that measures the wavefield in the cross-line direction in order to obtain the cross-line particle-velocity data, $v_y(\vec{x}_r, t)$. In certain implementations, the receivers may by composed of only pressure sensors, and in other implementations, the receivers may be composed of only particle motion sensors.

The streamers 106-111 and the survey vessel 102 may include sensing electronics and data-processing facilities that allow seismic data generated by each receiver to be correlated with the time the source 104 is activated, absolute positions on the free surface 112, and/or absolute three-dimensional positions with respect to an arbitrary three-dimensional coordinate system. The pressure data and particle-motion data may be stored at the receiver, and/or may be sent along the streamers and data transmission cables to the survey vessel 102, where the data may be stored electronically or magnetically on data-storage devices located onboard the survey vessel 102. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

Returning to FIG. 2, directional arrow 208 represents the direction of an up-going wavefield at the location of receiver 118 and dashed-line arrow 210 represents a down-going wavefield produced by reflection of an up-going wavefield from the free surface 112 before reaching the receiver 118. In other words, the pressure wavefield is composed of an up-going pressure wavefield and a down-going pressure wavefield, and the particle motion wavefield is composed of an up-going wavefield and a down-going wavefield. The down-going wavefield, also called the "ghost wavefield," may interfere with the pressure and particle-motion data generated by the receivers and may create notches in the seismic data spectral domain.

As explained above, each pressure sensor 204 and particle motion sensor 206 may generate seismic data that may be stored in data-storage devices located onboard the survey vessel. Each pressure sensor and particle motion sensor may include an analog-to-digital converter that converts time-dependent analog signals into discrete time series that consist of a number of consecutively measured values called "amplitudes" separated in time by a sample rate. The time series generated by a pressure or particle motion sensor is called a "trace," which may consist of thousands of samples collected at a typical sample rate of about 1 to 5 ms. A trace is a recording of a subterranean formation response to acoustic energy that passes from an activated source into the subterranean formation where a portion of the acoustic energy is reflected and/or refracted and ultimately detected by a receiver as described above. A trace records variations in a time-dependent amplitude that represents acoustic energy in the portion of the secondary wavefield measured by the receiver. The coordinate location of each time sample generated by a moving receiver may be calculated form global position information obtained from one or more global positioning devices located along the streamers, survey vessel, and buoys and the known geometry and arrangement of the streamers and receiver. As a result, each trace may be represented as a set of discrete time-dependent pressure or particle-motion sensor amplitudes denoted by:

$$tr(r) = \{c_r(x_m, y_m, t_m)\}_{m=1}^{M} \quad (1)$$

where
   $c_r$ may represent pressure, particle displacement, particle velocity, or particle acceleration amplitude at sensor spatial coordinates $x_m$ and $y_m$ and time sample $t_m$; and
   M is the number of time samples in the trace.

As explained above, the secondary wavefield typically arrives first at the receivers located closest to the sources. The distance from the sources to a receiver is called the "source-receiver offset," or simply "offset," which creates a delay in the arrival time of a secondary wavefield from an interface within the subterranean formation. A larger offset generally results in a longer arrival time delay. The traces are collected to form a "gather" that can be further processed using various seismic data processing techniques in order to obtain information about the structure of the subterranean formation.

Figure 3:
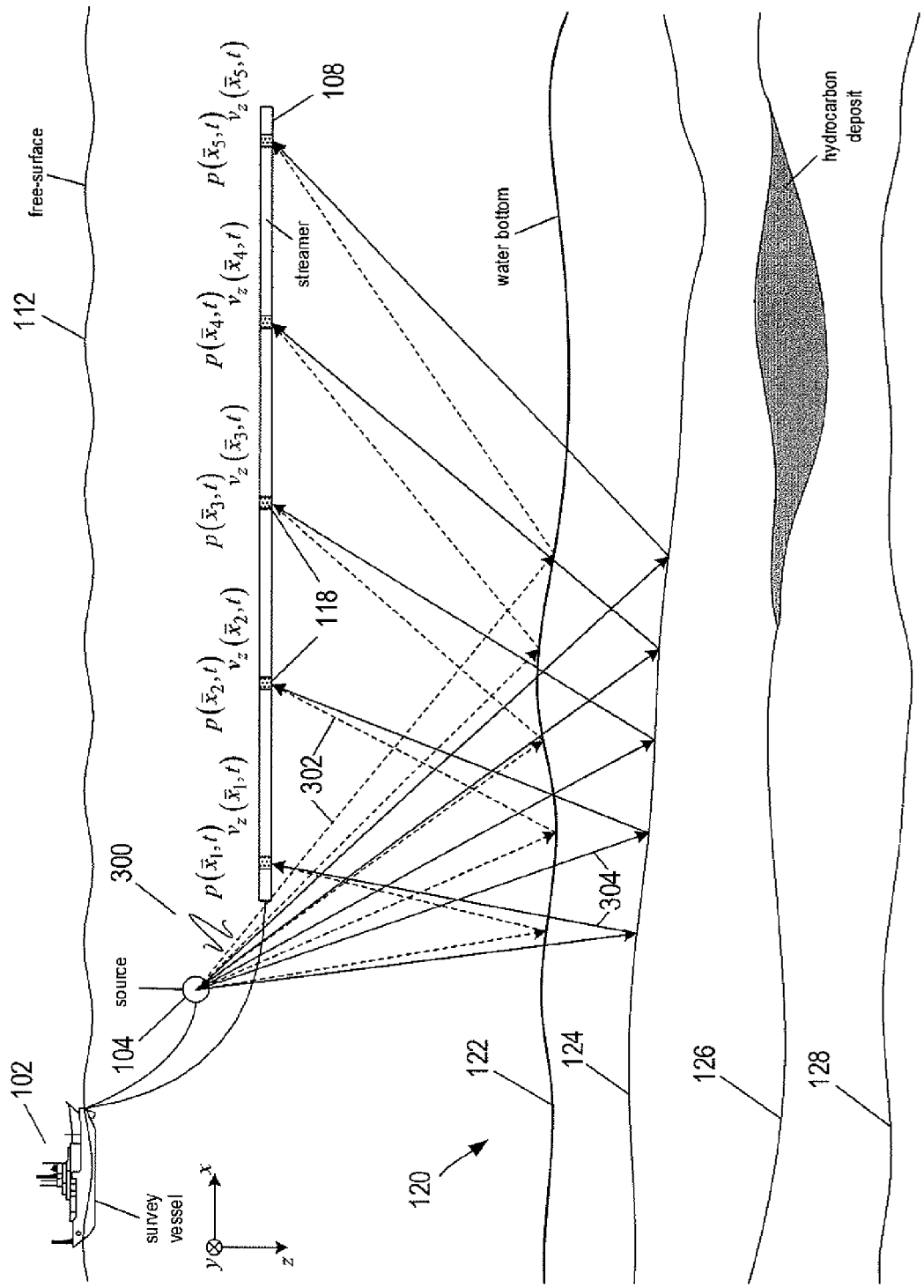
FIG. 3 shows an example of acoustic energy ray paths emanating from a source.

FIG. 3 shows example ray paths of an acoustic signal 300 that travels from the first source 104 to or into the subterranean formation 120. Dashed-line rays, such as rays 302, represent acoustic energy reflected from the formation surface 122 to the receivers 118 located along the streamer 108, and solid-line rays, such as rays 304, represent acoustic energy reflected from the interface 124 to the receivers 118 located along the streamer 108. Note that for simplicity of illustration only a handful of ray paths are represented. Each pressure sensor may measure the pressure variation, and each particle motion sensor may measure the particle displacement, velocity, or acceleration of the acoustic energy reflected from the subterranean formation 120 or interfaces therein. In the example of FIG. 3, the particle motion sensors located at each receiver 118 measure vertical-particle-velocity of the wavefield emanating from the subterranean formation 120. The pressure data and/or particle displacement, velocity, or acceleration data generated at each receiver 118 may be time sampled and recorded as separate traces. In the example of FIG. 3, the collection of traces generated by the receivers 118 along the streamer 108 for a single activation of the source 104 may be collected to form a "common-shot gather" or simply a "shot gather." The traces generated by the receivers located along each of the other five streamers for the same activation may be collected to form separate common-shot gathers, each gather associated with one of the streamers.

Figure 4:
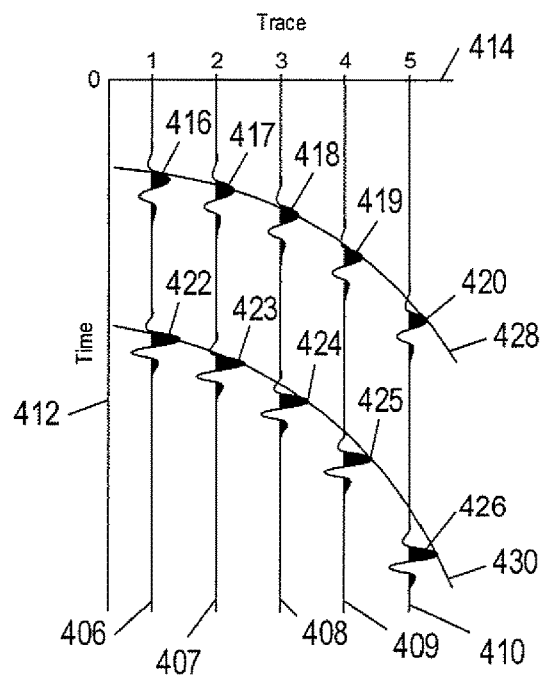
FIG. 4 shows a plot of a common-shot gather measured by five receives located along a streamer shown in FIG. 4.

FIG. 4 shows a plot of a common-shot gather composed of example traces 406-410 of the wavefield measured by the five receives located along the streamer 108 shown in FIG. 3. Vertical axis 412 represents time and horizontal axis 414 represents trace numbers with trace "1" representing the seismic data generated by the receiver 118 located closest to the source 104 and trace "5" representing the seismic data generated by the receiver 118 located farthest along the length of the streamer from the source 104. The traces 406-410 may represent variation in the amplitude of either the pressure data or the particle-motion data recorded by corresponding sensors of the five receivers 118. The example traces include wavelets or pulses 416-420 and 422-426 that represent the up-going wavefield measured by the pressure sensors or particle motion sensors. Peaks, colored black, and troughs of each trace represent changes in the amplitude. The distances along the traces 406-410 from the trace number axis 414 (i.e., time zero) to the wavelets 416-420 represents two-way travel time of the acoustic energy output from the source 104 to the formation surface 122 and to the receivers 118 located along the streamer 108, and wavelets 422-426 represents longer two-way travel time of the acoustic energy output from the source 104 to the interface 124 and to the same receivers 118 located along the streamer 108. The amplitude of the peak or trough of the wavelets 416-420 and 422-426 indicate the magnitude of the reflected acoustic energy recorded by the receivers 118.

The arrival times versus source-receiver offset is longer with increasing source-receiver offset. As a result, the wavelets generated by a formation surface or an interface are collectively called a "reflected wave" that tracks a hyperbolic curve. For example, hyperbolic curve 428 represents the hyperbolic distribution of the wavelets 416-420 reflected from the formation surface 122, which are called a "formation surface reflected wave," and hyperbolic curve 430 represents the hyperbolic distribution of the wavelets 422-426 from the interface 124, which are called an "interface reflected wave."

Figure 5:
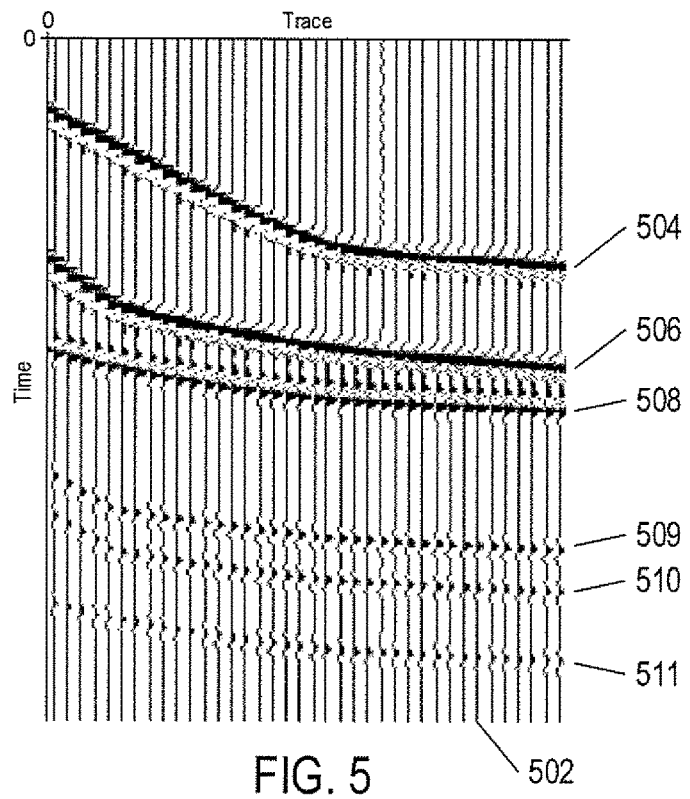
FIG. 5 shows an expanded view of a gather.

FIG. 5 shows an expanded view of a gather composed of 38 traces. Each trace, such as trace 502, varies in amplitude over time and represents acoustic energy reflected from a subterranean formation surface and five different interfaces within the subterranean formation as measured by a pressure sensor or a particle motion sensor. In the expanded view, wavelets that correspond to reflections from the formation surface or an interface within the subterranean formation appear chained together to form reflected waves. For example, wavelets 504 with the shortest transit time represent a formation surface reflected wave, and wavelets 506 represent an interface reflected wave emanating from an interface just below the formation surface. Reflected waves 508-511 represent reflections from interfaces located deeper within the subterranean formation.

The gather shown in FIG. 4 is sorted in a common-shot domain and the gather shown in FIG. 5 is sorted into a common-receiver domain. A domain is a collection of gathers that share a common geometrical attribute with respect to the seismic data recording locations. The seismic data may be sorted into any suitable domain for examining the features of a subterranean formation including a common-receiver domain, a common-receiver-station domain, or a common-midpoint domain.

As explained above, a wavefield measured by pressure and particle motions sensors includes an up-going wavefield and a down-going wavefield. The up-going wavefield may be further processed in order to generate seismic images of a subterranean formation. The seismic images may be used to extract information about the subterranean formation, such as locate and identify hydrocarbon reservoirs or monitor production of an existing hydrocarbon reservoir. However, the down-going wavefield creates interference that is manifest as notches in the frequency spectrum and ghost effects in the seismic images. The pressure and particle motion wavefields measured by the sensors allow wavefield separation into up-going and down-going wavefields so that the up-going wavefields may be isolated used to generate seismic images.

Figure 6A:
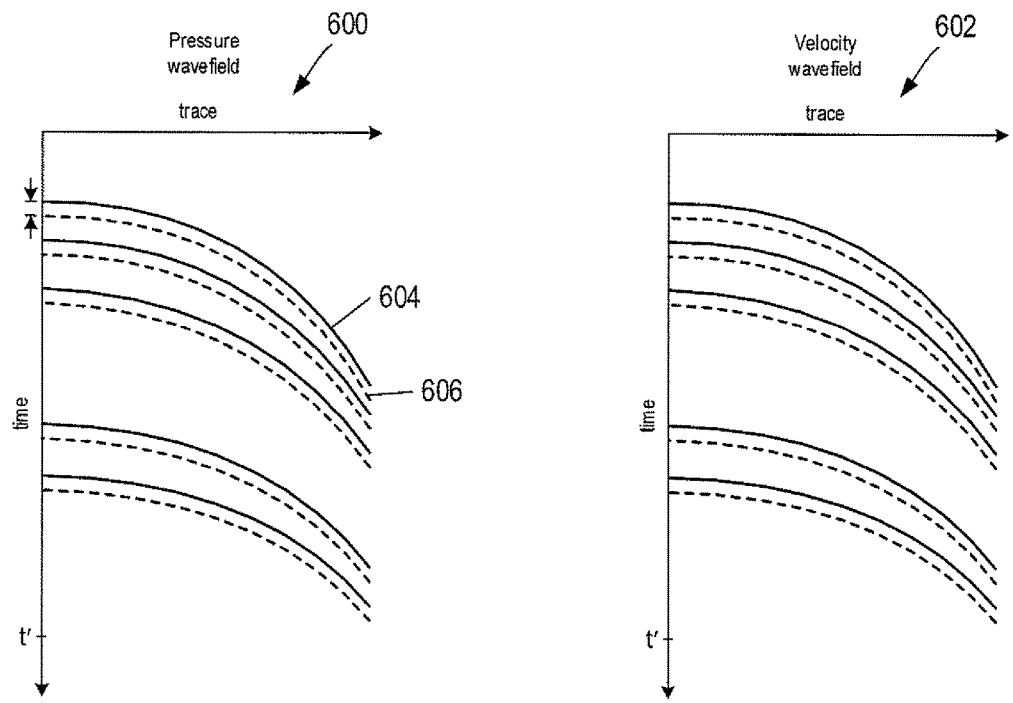
FIGS. 6A-6C show an overview of wavefield separation applied to a pressure wavefield to obtain up-going and down-going pressure wavefields.
Figure 6B:
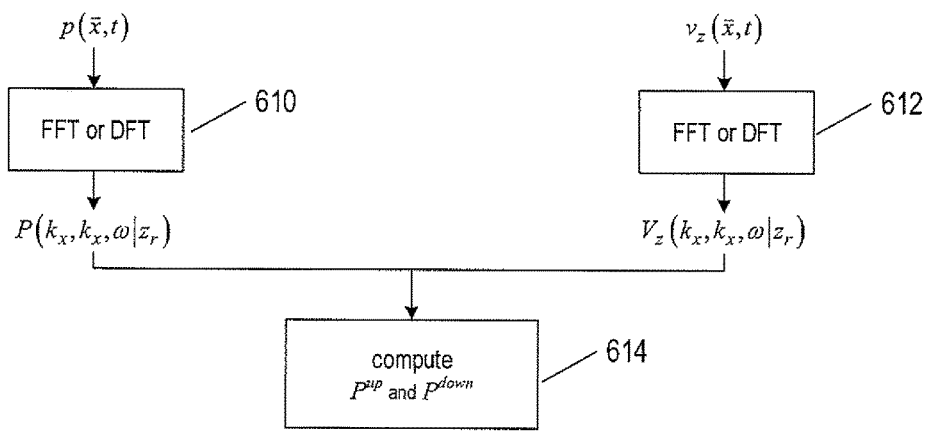
Figure 6C:
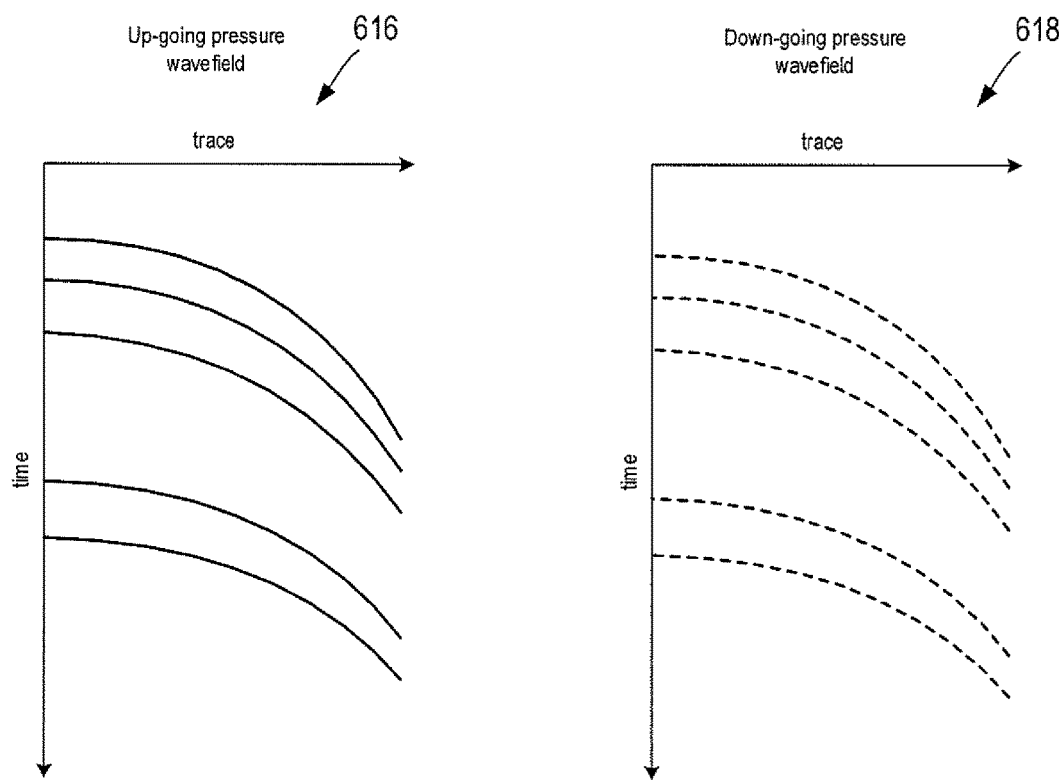

FIGS. 6A-6C show an overview of wavefield separation applied to a pressure wavefield to obtain up-going and down-going pressure wavefields. In FIG. 6A, a first synthetic common-shot gather 600 represents a pressure wavefield measured by a number of pressure sensors located along a streamer, and a second common-shot gather 602 represents a particle motion wavefield measured by particle motion sensors collocated with the pressure sensors. The gathers 600 and 602 represents wavefields recorded for a time t' after a single activation of a source. For the sake of simplicity, the gathers 600 and 602 show only up-going and down-going pressure wavefields with solid curves representing the up-going pressure wavefield reflections and dashed curves representing the down-going pressure wavefield reflections. For example, solid curve 604 represents pressure variations created by a water-bottom reflection and dashed curve 606 represents pressure variations created by the same water-bottom reflection with a time delay 608 resulting from the time it takes for acoustic energy to travel up past the streamer to the free surface and back down to the streamer, as described above with reference to FIG. 2.

The multi-component sensor acquisition of both pressure and particle motion wavefields at each receiver allow for removal of receiver ghost effects, leaving the up-going pressure or particle motion wavefield to compute seismic images of a subterranean formation free of receiver ghost effects. FIG. 6B shows a method for separating a pressure wavefield into up-going and down-going pressure wavefields. In FIG. 6B, the pressure wavefield gather 600 is transformed at 610 from the space-time ("s-t") domain using a fast Fourier transform ("FFT"), or a discrete Fourier transform ("DFT"), to obtain a pressure wavefield in the frequency-wavenumber ("f-k") domain. In particular, each trace in the pressure wavefield gather 600 may be transformed as follows:

$$p(\vec{x}_r, t) \xrightarrow{FT} P(k_x, k_y, \omega | z_r) \quad (3)$$

where
$k_x$ is the x-direction or in-line wavenumber;
$k_y$ is the y-direction or cross-line wavenumber; and
$\omega$ is the angular frequency.

Likewise, the particle motion wavefield 602 may be transformed from the s-t domain using an FFT or a DFT to obtain a particle motion wavefield in the f-k domain. Each trace in the vertical-particle-velocity wavefield represented by the gather 602 is transformed as follows:

$$v_z(\vec{x}_r, t) \xrightarrow{FT} V_z(k_x, k_y, \omega | z_r) \quad (4)$$

In the f-k domain, the pressure may be represented as a sum of up-going pressure and down-going pressures as follows:

$$P(k_x,k_y,\omega|z_r) = P^{up}(k_x,k_y,\omega|z_r) + P^{down}(k_x,k_y,\omega|z_r) \quad (5)$$

where
$P^{up}(k_x,k_y,\omega|z_r)$ represents the up-going pressure in the f-k domain; and
$P^{down}(k_x,k_y,\omega|z_r)$ represents the down-going pressure in the f-k domain.

The pressure and vertical-particle-velocity wavefields may be used to compute at 614 up-going and down-going pressure data in the f-k domain according to $$P^{up}(k_x, k_y, \omega | z_r) = \frac{1}{2}\left[P(k_x, k_y, \omega | z_r) - \frac{\rho\omega}{k_z}V_z(k_x, k_y, \omega | z_r)\right] \quad (6a)$$

$$P^{down}(k_x, k_y, \omega | z_r) = \frac{1}{2}\left[P(k_x, k_y, \omega | z_r) + \frac{\rho\omega}{k_z}V_z(k_x, k_y, \omega | z_r)\right] \quad (6b)$$

where
$\rho$ is the density of water; and $$k_z = \sqrt{\left(\frac{\omega}{c}\right)^2 - k_x^2 - k_y^2}$$

is the z-direction or vertical wavenumber with c the speed of sound in water.

The separate up-going and down-going pressures may be transformed from the f-k domain back to the s-t domain using an inverse FFT ("IFFT"), or inverse ("IDFT"), to obtain corresponding separate up-going and down-going pressures in the s-t domain.

FIG. 6C shows the separate up-going and down-going pressure wavefields, originally shown as combined pressure wavefield gather 600 of FIG. 6A, as separate up-going pressure wavefield in the gather 616 and down-going pressure wavefield in the gather 618. The seismic data represented by the up-going pressure wavefield in the gather 616 may be subjected to further seismic data processing to remove noise and other effects and serve as input to imaging methods that generate seismic images of the subterranean formation. The seismic images are free of the ghost effects contained in the down-going pressure wavefield 618, resulting in significantly higher resolution and deeper signal penetration into the subterranean formation than seismic images computed with the unseparated seismic data represented in the pressure wavefield gather 600.

The vertical-particle-velocity data may also be a sum of up-going and down-going vertical velocities in the f-k domain as follows:

$$V_z(k_x,k_y,\omega|z_r) = V_z^{up}(k_x,k_y,\omega|z_r) + V_z^{down}(k_x,k_y,\omega|z_r) \quad (7)$$

where
$V_z^{up}(k_x, k_y, \omega|z_r)$ represents the up-going vertical-particle-velocity wavefield in the f-k domain; and
$V_z^{down}(k_x, k_y, \omega|z_r)$ represents the down-going vertical-particle-velocity wavefield in the f-k domain.

The pressure and vertical-particle-velocity wavefield data may be used to compute the vertical-particle-velocity data into the up-going and down-going vertical velocities in the f-k domain according to:

$$V_z^{up}(k_x, k_y, \omega \mid z_r) = \frac{1}{2}\left[V_z(k_x, k_y, \omega \mid z_r) - \frac{k_z}{\rho\omega}P(k_x, k_y, \omega \mid z_r)\right] \quad (8a)$$

$$V_z^{down}(k_x, k_y, \omega \mid z_r) = \frac{1}{2}\left[V_z(k_x, k_y, \omega \mid z_r) + \frac{k_z}{\rho\omega}P(k_x, k_y, \omega \mid z_r)\right] \quad (8b)$$

The up-going vertical-particle-velocity wavefield may be subjected to further seismic data processing to remove noise and other effects and, like the up-going pressure wavefield, serve as input to imaging methods that generate seismic images of the subterranean formation.

In practice, however, pressure and vertical-particle-velocity wavefields do not share the same broad frequency spectrum. For example, pressure sensors typically have a high signal-to-noise ratio over a broad frequency spectrum, but particle motion sensors often detect low-frequency, streamer vibrational motion that contaminates the low frequency part of the vertical-particle-velocity data. As a result, particle motion sensors typically have a low signal-to-noise ratio over the low-frequency part of the frequency spectrum.

Figure 7A:
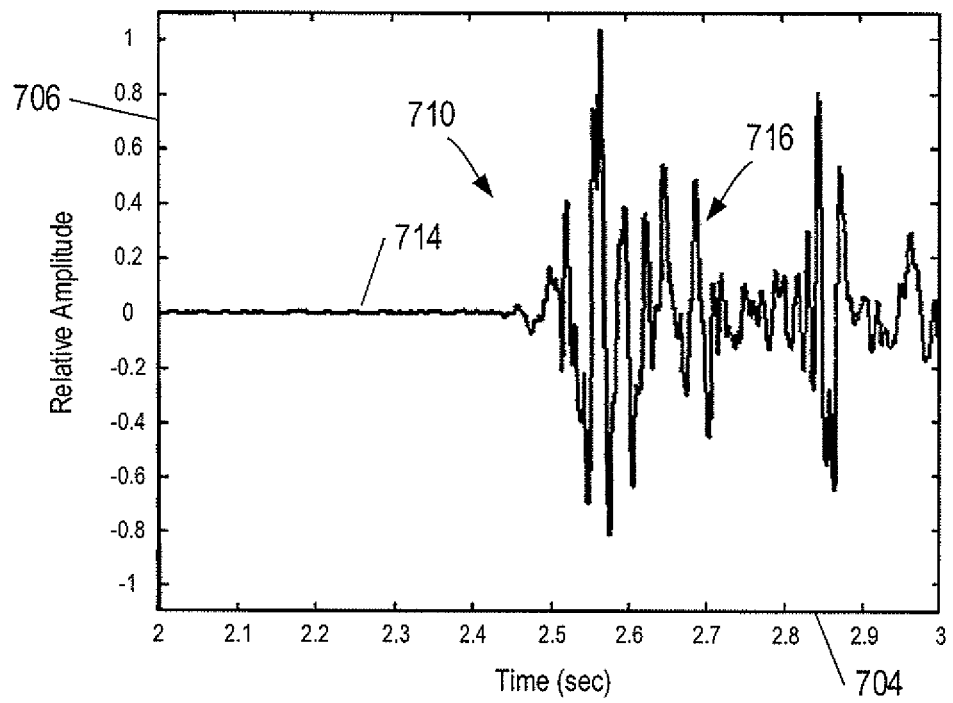
FIGS. 7A-7B show relative amplitude versus time plots of pressure data and particle-motion data generated by collocated pressure and particle motion sensors
Figure 7B:
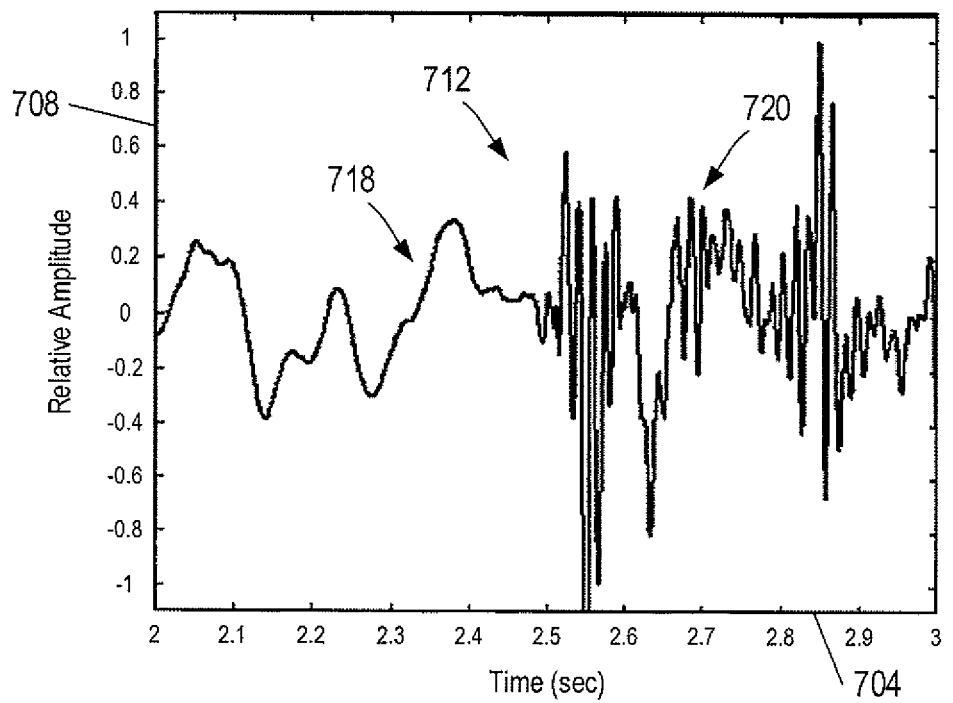

FIGS. 7A-7B show relative amplitude versus time plots of pressure data and vertical-particle-velocity data, respectively, generated by collocated pressure and particle motion sensors locate at a depth of about 13 meters below the free surface. Horizontal axes 702 and 704 represent the same time interval, and vertical axes 706 and 708 represent relative amplitude. In FIG. 7A, waveform 710 represents water pressure changes measured by the pressure sensor in response to an acoustic signal generated by a source. In FIG. 7B, waveform 712 represents the vertical-particle-velocity wavefield changes in the water measured by the particle motion sensor in response to the same acoustic signal. The waveform 710 exhibits a flat region 714 (i.e., approximately zero amplitude variation) and a rapidly varying region 716 that begins at about 2.45 sec, which corresponds to water pressure changes resulting from the acoustic signal. By contrast, the waveform 712 exhibits a slowly varying region 718 that switches to a rapidly varying region 720 at about 2.45 sec. The slowly varying region 718 is the low-frequency particle motion that may include noise resulting from streamer vibrations detected by the particle motion sensor. The rapidly varying region 720 is the particle motion resulting from the acoustic signal. The flat region 714 in FIG. 7A indicates that the pressure sensor does not detect the same streamer vibration.

Figure 8:
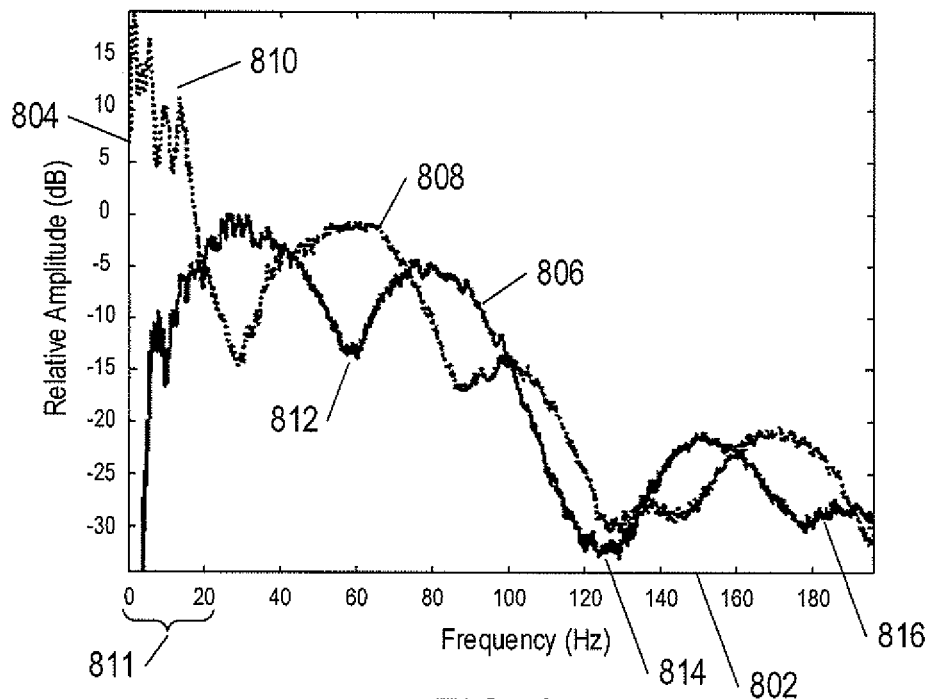
FIG. 8 shows frequency spectra for the pressure data and the particle-motion data shown in FIGS. 7A and 7B.

FIG. 8 shows frequency spectra for the pressure data and the vertical-particle-velocity data shown in FIGS. 7A and 7B. Horizontal axis 802 represents a frequency domain, vertical axis 804 represents relative amplitude, solid curve 806 represents the frequency spectrum of the pressure data shown in FIG. 7A ("pressure spectrum"), and dotted curve 808 represents the frequency spectrum of the vertical-particle-velocity data shown in FIG. 7B ("vertical-particle-velocity spectrum"). Low-frequency part 810 of the vertical-particle-velocity spectrum corresponds to the slowly varying region 718 in FIG. 7B. The large relative amplitude of the low-frequency part 810 results from the low-frequency streamer vibrations and the corresponding range of frequencies is called the "low-frequency range" 811, which, in this example, ranges from about 0 to about 20 Hz. The pressure spectrum 806 and the vertical-particle-velocity spectrum 808 above the low-frequency range 811 exhibit satisfactory signal-to-noise ratios.

The spectrum in FIG. 8 demonstrate that up-going and down-going pressure and vertical-particle-velocity wavefields above a low-frequency range, such as the low-frequency range 811, may be calculated according to Equations (6) and (8). However, because the combined signal-to-noise ratio for the pressure and vertical-particle-velocity spectra over the low-frequency range is low, as shown in the example of FIG. 8A, the up-going and down-going pressure and vertical-particle-velocity wavefields over the low-frequency range may not be calculated according to Equations (6) and (8). An estimated vertical-particle-velocity wavefield may be calculated to replace the vertical-particle-velocity wavefield over the low-frequency range from the pressure wavefield over the low-frequency range provided (1) the pressure wavefield has a satisfactory signal-to-noise ratio over the low-frequency range, (2) the pressure spectrum of the pressure wavefield has no notches over the low-frequency range, and (3) the depth of the pressure and particle motion sensors are known. As shown in FIG. 8, the relative amplitude of the pressure spectrum 806 exhibits notches 812, 814, and 816 that depend on the depth of the streamer. The notches 812, 814, and 816 are shifted toward lower frequencies as streamer depth increases and shifted toward higher frequencies as streamer depth decreases. For the example spectra shown in FIG. 8, the pressure spectrum 806 does not have notches in the low-frequency range 811, indicating that the pressure wavefield over the low-frequency range may be used to calculate estimated vertical-particle-velocity wavefield over the low-frequency range 811.

An estimated vertical-particle-velocity wavefield over a low-frequency range may be calculated from the pressure wavefield over the low-frequency range using the following expression:

$$V_z'(k_x, k_y, \omega \mid z_r) = -\frac{k_z}{\rho\omega}\frac{(1 - Re^{-i2z_rk_z})}{(1 + Re^{-i2z_rk_z})}P(k_x, k_y, \omega \mid z_r) \quad (9)$$

where R is the free-surface reflectivity (e.g., R=−1 for a flat free-surface approximation).

The estimated vertical-particle-velocity wavefield given by Equation (9) may be substituted for the vertical-particle-velocity wavefield over the low-frequency range and tapered with the remainder of the vertical-particle-velocity wavefield using low- and high-pass filters to obtain a combined vertical-particle-velocity wavefield with a satisfactory signal-to-noise ratio over the full spectrum.

In one implementation, the low-frequency part of the vertical-particle-velocity wavefield is replaced by the estimated vertical-particle-velocity wavefield using a combined vertical-particle-velocity wavefield given by:

$$V_z^{reb}(k_x, k_y, \omega \mid z_r) = \begin{cases} V_z'(k_x, k_y, \omega \mid z_r) & \omega \leq \omega_n \\ F_L V_z'(k_x, k_y, \omega \mid z_r) + F_H V_z(k_x, k_y, \omega \mid z_r) & \omega_n < \omega \leq \omega_c \\ V_z(k_x, k_y, \omega \mid z_r) & \omega_c < \omega \end{cases} \quad (10)$$

where $\omega_n$ is an upper limit on the low-frequency range;
$\omega_c$ is the cutoff frequency; and
$F_L$ is a low-pass filter and $F_H$ is a high-pass filter that satisfy a condition $$F_L + F_H = 1 \quad (11)$$

The cutoff frequency $\omega_c$ is selected to be less than the lowest frequency notch in the pressure spectrum. For example, with reference to FIG. 8, the cutoff frequency should be less than about 60 Hz, which corresponds to the first notch 812. The low- and high-pass filters may be frequency dependent:

$$F_L = 1 - \frac{\omega - \omega_n}{\omega_c - \omega_n} \quad (12a)$$

for $\omega_n < \omega \leq \omega_c$ $$F_H = \frac{\omega - \omega_n}{\omega_c - \omega_n} \quad (12b)$$

In one implementation, the low-frequency part of the vertical-particle-velocity wavefield may be replaced by the low-frequency part of the estimated vertical-particle-velocity wavefield based on wavenumber-dependent low- and high-pass filters of Equation (12) with the upper limit on the low-frequency range and the cutoff frequency given by:

$$\omega_n(k_x, k_y) = c\sqrt{\left(\frac{\pi}{r_r}\right)^2 + k_x^2 + k_y^2} - \left(c\frac{\pi}{z_r} - \omega_{n0}\right) \quad (13a)$$

$$\omega_c(k_x, k_y) = c\sqrt{\left(\frac{\pi}{r_r}\right)^2 + k_x^2 + k_y^2} - \left(c\frac{\pi}{z_r} - \omega_{c0}\right) \quad (13b)$$

where
$\omega_{n0}$ is low-frequency range lower limit; and
$\omega_{c0}$ is cutoff frequency lower limit.
The upper limit on the low-frequency range $\omega_n$ and the cutoff frequency $\omega_c$ vary in an angle dependent manner with the ghost notches.

In another implementation, the low- and high-frequency filters may depend on pressure sensor and particle motion sensor signal-to-noise ratios as follows:

$$F_L = \frac{SN_H - SN_G}{SN_H + SN_G} \quad (14a)$$

$$F_H = 1 - F_L \quad (14b)$$

where
$SN_H$ is the signal-to-noise ratio for a pressure sensor; and
$SN_G$ is the signal-to-noise ratio for the particle motion sensor.

The signal-to-noise ratios may be defined as functions of frequency and horizontal wavenumbers in order to obtain $F_L(\omega, k_x, k_y)$ and $F_H(\omega, k_x, k_y)$.

Figure 9:
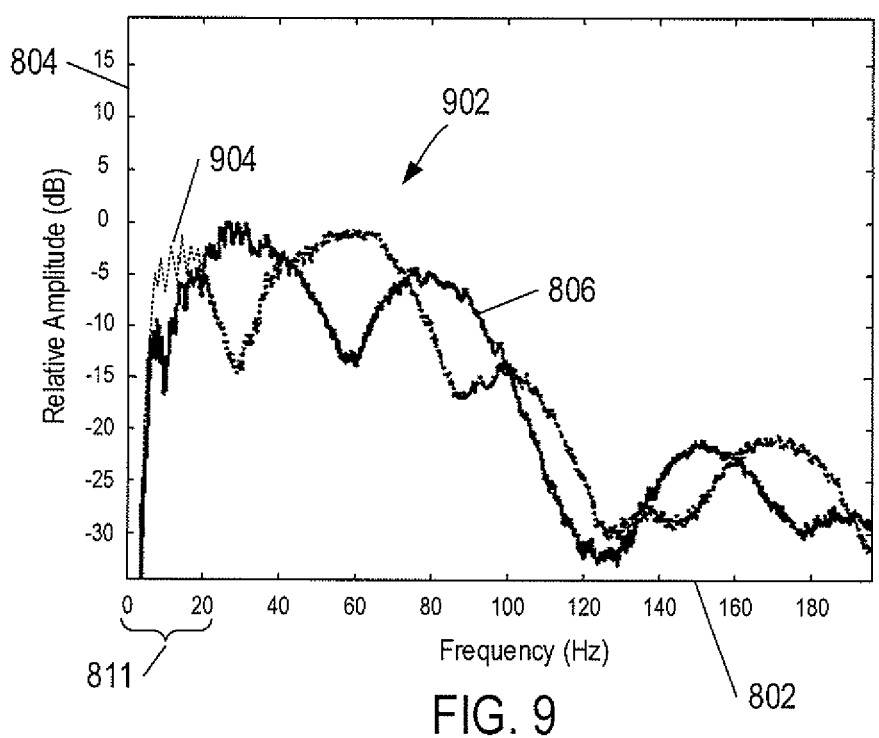
FIG. 9 shows the pressure spectrum and an example combined vertical-particle-velocity spectrum.

FIG. 9 shows the pressure spectrum 806 and an example combined vertical-particle-velocity spectrum 902. The combined vertical-particle-velocity spectrum 902 represents use of Equation (10) which is composed the vertical-particle-velocity spectrum 808 of FIG. 8 for frequencies greater than about 20 Hz and a synthetic estimated vertical-particle-velocity spectrum 904 over the low-frequency range 811.

Wavefield separation described above with reference to FIGS. 6A-6C and Equations (6) and (8) is typically performed on individual shot records. A typical shot record is a pressure or vertical-velocity wavefield recorded after for about 8-12 seconds after a single activation of a source. For example, returning to FIG. 6A, the gathers 600 and 602 represent pressure and vertical-velocity wavefields (i.e., shot records) recorded for t' seconds after a single activation of the source. Wavefield separation of Equation (6) and (8) is based on the approximation that the receivers are stationary when the pressure and vertical-particle-velocity wavefields were measured. This approximation is typically acceptable for individual shot records because the survey vessel typically travels at a slow rate of speed (e.g., about 5 knots) and the wavefield may be recorded for a short period of time after activation of the source (e.g., about 8-12 seconds).

On the other hand, with near-continuous wavefield recording, pressure and vertical-particle-velocity wavefields are recorded over much longer distances and periods of time. Because the receivers are near-continuously measuring the wavefields over a considerably longer distance and time than is traditionally done for a typical shot record, the motion of the receivers may be corrected in order to determine seismic data for approximately stationary-receiver locations before applying typical wavefield separation. Methods and systems now described are directed to wavefield separation based on the locations of the receivers.

Figure 10:
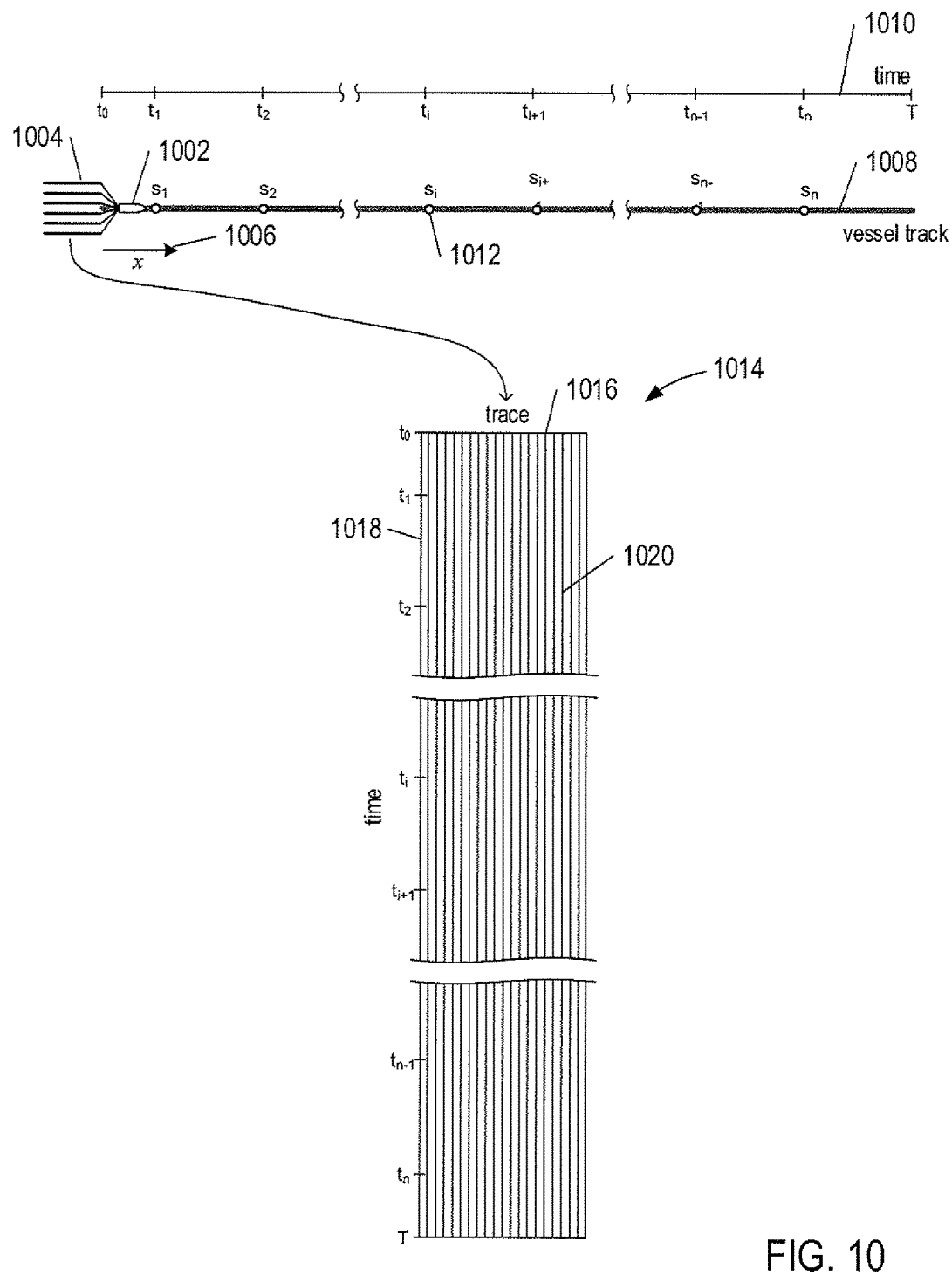
FIG. 10 shows an example near-continuous wavefield recorded for a survey vessel traveling a vessel track of a marine seismic survey.

FIG. 10 shows an example of recording a near-continuous wavefield as a survey vessel travels a long vessel track of a marine seismic survey. In the example of FIG. 10, a survey vessel 1002 tows six streamers 1004 and a source (not shown) in the in-line or x-direction 1006 along a straight vessel track 1008. FIG. 10 includes a time axis 1010 with source-activation times $t_i$, where i=1, 2, . . . , n. Time $t_0$ represents a time when the receivers begin measuring wavefields and near-continuously generate seismic data, and time T represents a time when seismic-data measuring and recording stops or pauses. Open circles, such as open circle 1012, located along vessel track 1008 represent source-activation locations $s_i$, where i=1, 2, . . . , n, along the vessel track 1008. The source-activation locations correspond to the source-activation times. In the example of FIG. 10, the survey vessel travels at a substantially constant rate of speed along the vessel track 1008. Activation of the source along the vessel track 1008 may be based on location or time. For a location-based survey, the source is activated when the source reaches each of the source-activation locations $s_i$, and source-activation times $t_i$ indicate when the source was activated at each source-activation location. On the other hand, for a time-based survey, the source is activated based on the source-activation times, and the source-activation locations identify the coordinate location of the source when the source was activated at a particular source-activation time.

FIG. 10 additionally shows a gather 1014 that represents a near-continuous pressure or vertical-particle-velocity wavefield generated by a set of pressure or particle motion sensors, respectively, of the streamers 1004 as the survey vessel travels the vessel track 1008. The gather includes a trace axis 1016 and a time axis 1018. Time $t_0$ is the time when the survey begins, such as when the receivers begin generating seismic data recorded by a data-storage device, times $t_i$, i=1, 2, . . . , n, correspond to the source-activation times, and T represents the time when seismic-data generation stops. Each line in the gather 1014, such as line 1020, represents a single trace (wavelets not shown) near-continuously generated by the same pressure or particle motion sensor of the streamers 1004 as the survey vessel 1002 travels the length of the vessel track 1008.

A gather of near-continuously recorded traces of seismic data produced by a set of pressure or particle motion sensors of a seismic data acquisition surface towed by a survey vessel traveling along a vessel track is called a "near-continuous wavefield." In practice, however, any number of the traces forming a near-continuous wavefield may include breaks or blank places where no seismic data is recorded due to equipment stoppage, breakdown, or malfunction. For example, a near-continuous wavefield may have any number of traces with complete, uninterrupted time samples while other traces in the same near-continuous wavefield may have breaks or blank places due to receiver perturbations and/or interruptions in data transmission from certain receivers to a data-storage device. The term "near-continuous wavefield" refers to seismic-data records or gathers of time-sampled traces that have been recorded without significant interruptions and refers to seismic-data records or gathers with any number of incomplete time-sampled traces.

Figure 11:
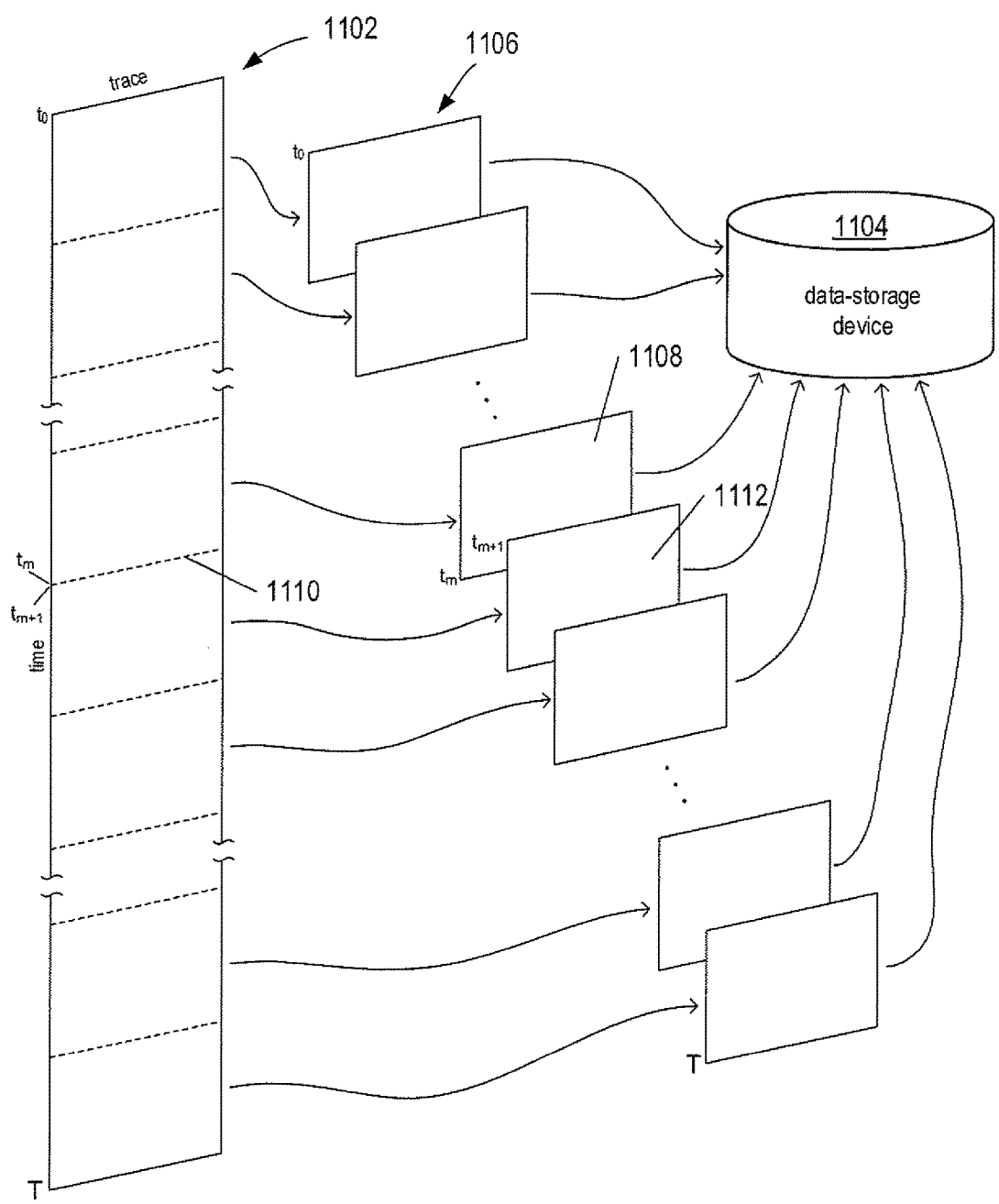
FIG. 11 shows an example of a near-continuous wavefield partitioned into a series of smaller component wavefields stored separately in a data-storage device.

Vessel tracks are not restricted to straight lines as shown in FIG. 11. Vessel tracks may be curved, circular or any other suitable non-linear path. In other words, receiver locations may vary in both the x- and y-coordinate locations as a survey vessel travels a non-linear vessel track. For example, in coil shooting surveys, a survey vessel travels in a series of overlapping, near-continuously linked circular, or coiled, vessel tracks. The circular geometry of the vessel tracks acquires a wide range of offset seismic data across various azimuths in order to sample the subsurface geology in many different directions. Weather conditions and changing currents may also cause a survey vessel to deviate from linear vessel tracks.

A near-continuous wavefield may be stored as a data structure in a data-storage device located onboard a survey vessel or transmitted to and stored as a data structure in an onshore data-storage device. However, the information recorded in a near-continuous wavefield during a typical marine survey may be too large to store as a single data structure. For example, in addition to recording time sampled seismic data in each trace as the survey vessel travels along a vessel track, the data recorded with each trace may include the coordinate location of each receiver for each time sample (e.g., every 1 to 5 ms) over a long period of time. Because of the large volume of data associated with recording near-continuous wavefields, near-continuous wavefields may instead be partitioned into series of smaller more manageable seismic-data structures called "component wavefields."

FIG. 11 shows an example of a near-continuous wavefield partitioned into a series of smaller component wavefields that are stored separately in a data-storage device. A gather 1102 represents the near-continuous wavefield generated by a set of pressure or particle motion sensors towed by a survey vessel traveling a substantially linear or non-linear vessel track. In this example, the near-continuous wavefield 1102 is not actually stored as a single data structure in a data-storage device 1104. Instead, as the near-continuous wavefield 1102 is generated by the receivers while the survey vessel travels a vessel track, the near-continuous stream of seismic data input from the receivers is partitioned based on time and stored as a series 1106 of separate, consecutive component wavefields represented by rectangles, such as rectangle 1108, in the data-storage device 1104. In the example of FIG. 11, dashed lines segments, such as dashed line segment 1110, represent partition times between time samples where the near-continuous wavefield 1102 is partitioned into component wavefields. For example, component wavefield 1108 terminates at time sample $t_m$, and subsequent component wavefield 1112 begins at time sample $t_{m+1}$, where time samples $t_{m+1}$ and $t_m$ are separated by a time-sample interval $\Delta t$. While seismic data continues to stream in from the receivers, storage of the component wavefield 1108 in the data-storage device 1104 terminates with time sample $t_m$ and storage of a separate subsequent component wavefield 1112 begins with time sample $t_{m+1}$.

Figure 12:
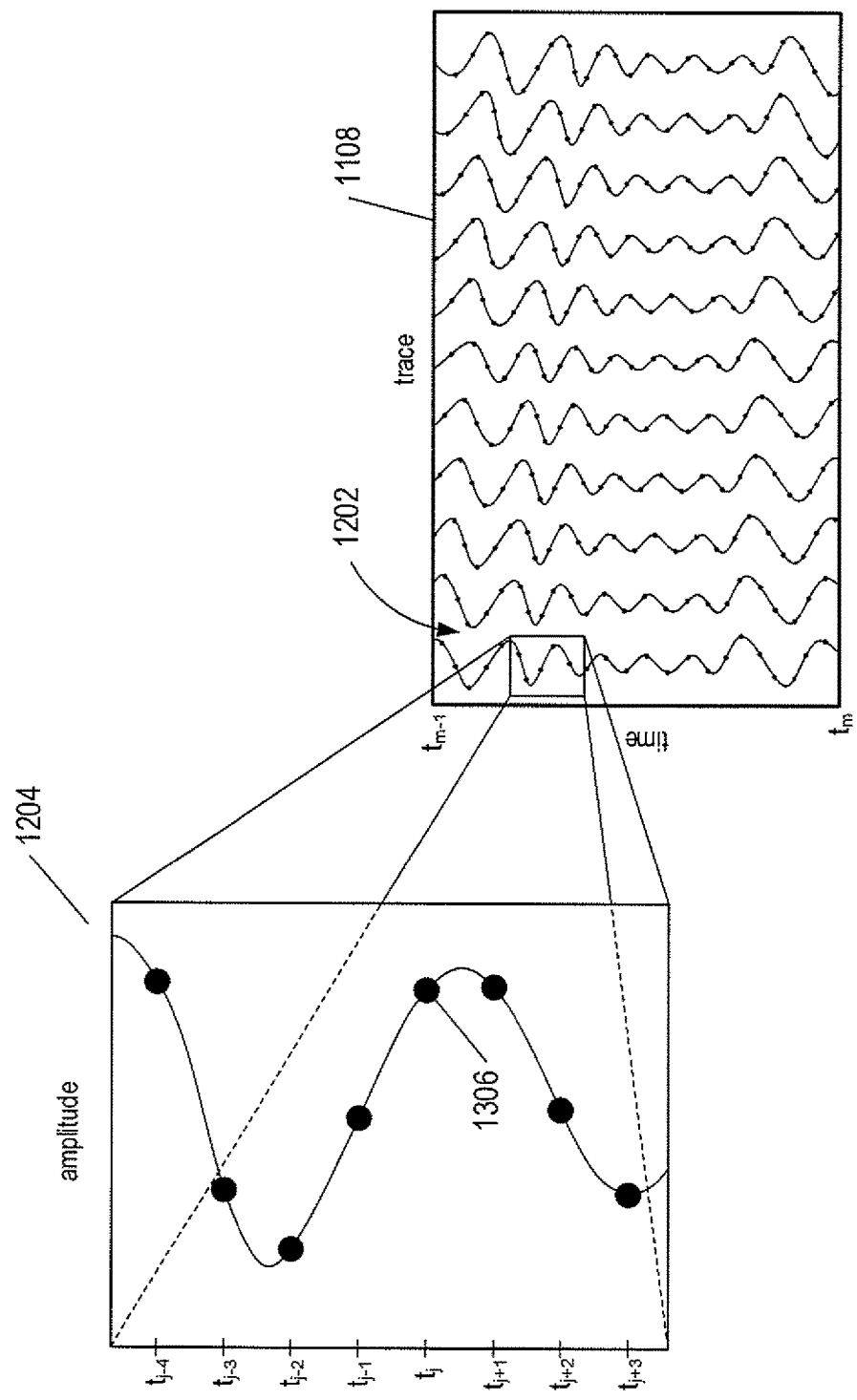
FIG. 12 shows an enlargement of a component wavefield shown in FIG. 12.

FIG. 12 shows an enlargement of the component wavefield 1108 shown in FIG. 11. In this example, the component wavefield 1108 is composed of eleven traces, such as trace 1202. FIG. 12 also includes a magnified view 1204 of the trace 1202 composed of time-sampled amplitudes represented by dots. For example, dot 1206 represents a pressure or particle motion amplitude measured at time sample $t_j$, where "j" is a time-sample index m−1≤j≤m.

Figure 13:
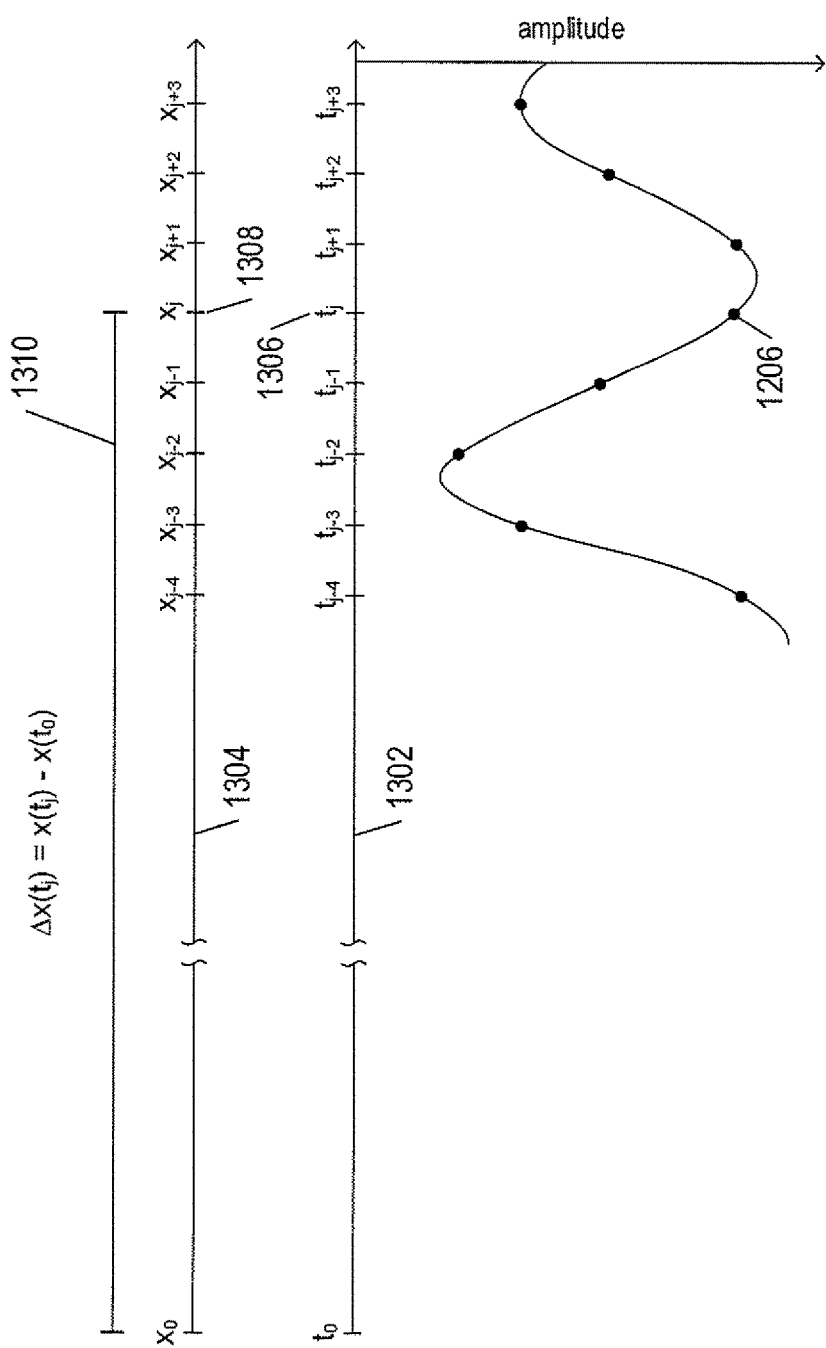
FIG. 13 shows calculation of distances a receiver has moved in one-dimension relative to a start time and start position of a near-continuous wavefield.

Correcting a near-continuous wavefield to account for location of the receivers when the seismic data is generated is based on the distance the receivers have moved since the start of recording the near-continuous wavefield. After such a correction has been applied, data in approximately stationary-receiver locations are obtained. FIG. 13 shows calculation of distances a receiver has moved in an in-line direction relative to the start time and start position of the near-continuous wavefield shown in FIG. 11. In this example, the survey vessel is assumed to travel a substantially linear vessel track in the x-direction. Axis 1302 represents the start time $t_0$ for generating the near-continuous wavefield 1102, and axis 1304 represents the x-direction traveled by the receiver with $x_0$ representing the initial x-coordinate location of the receiver at start time $t_0$. Each amplitude has a corresponding time sample and x-coordinate location of the receiver when the amplitude was recorded. For example, the amplitude 1206 is measured at time sample $t_j$ 1306 and x-coordinate $x_j$ 1308. Line 1310 represents the distance the receiver has moved in the x-direction relative to the initial location $x_0$ of the receiver. The distance the receiver has moved in the x-direction to reach the x-coordinate $x_j$ 1308 since the start of near-continuous recording is given by:

$$\Delta x(t_j) = x_j - x_0 \quad (15)$$

The distance given by Equation (15) is calculated for each receiver with respect to the receiver's initial location when recording began.

Distance-correction operators based on the distance $\Delta x(t_j)$ for each receiver may be used to correct a near-continuous wavefield for the changing location of the receivers in relation to the start location of the receivers. First, the near-continuous wavefield, or each component wavefield, is transformed from the space-time ("s-t") domain to the wavenumber-time ("k-t") domain using a FFT or DFT:

$$c_r(x_j, t_j) \rightarrow C_r(k_x, t_j) \quad (16)$$

Next, for a one-dimensional vessel track, a distance-correction operator given by:

$$O(k_x,t) = e^{-ik_x \Delta x(t)} \quad (17)$$

is applied to each time sample of a trace generated by a receiver that has traveled of the distance $\Delta x(t_j)$ in order to obtain distance-corrected amplitudes given by $$C_r(k_x,t_j)O(k_x,t_j) = C_r(k_x,t_j)e^{-ik_x \Delta x(tj)} \quad (18)$$

A distance-correction operator represented by Equation (17) is applied to each time sample of each trace of a near-continuous wavefield based on the distance $\Delta x(t_j)$ the receiver has moved along a vessel track since the beginning of recording the near-continuous wavefield.

When the survey vessel travels a non-linear vessel track, such as a curved vessel track of a coil shooting survey described above, each time sample of a trace is associated with different x- and y-coordinate location. In other words, the receiver coordinates change in both the x- and y-coordinate locations.

Figure 14:
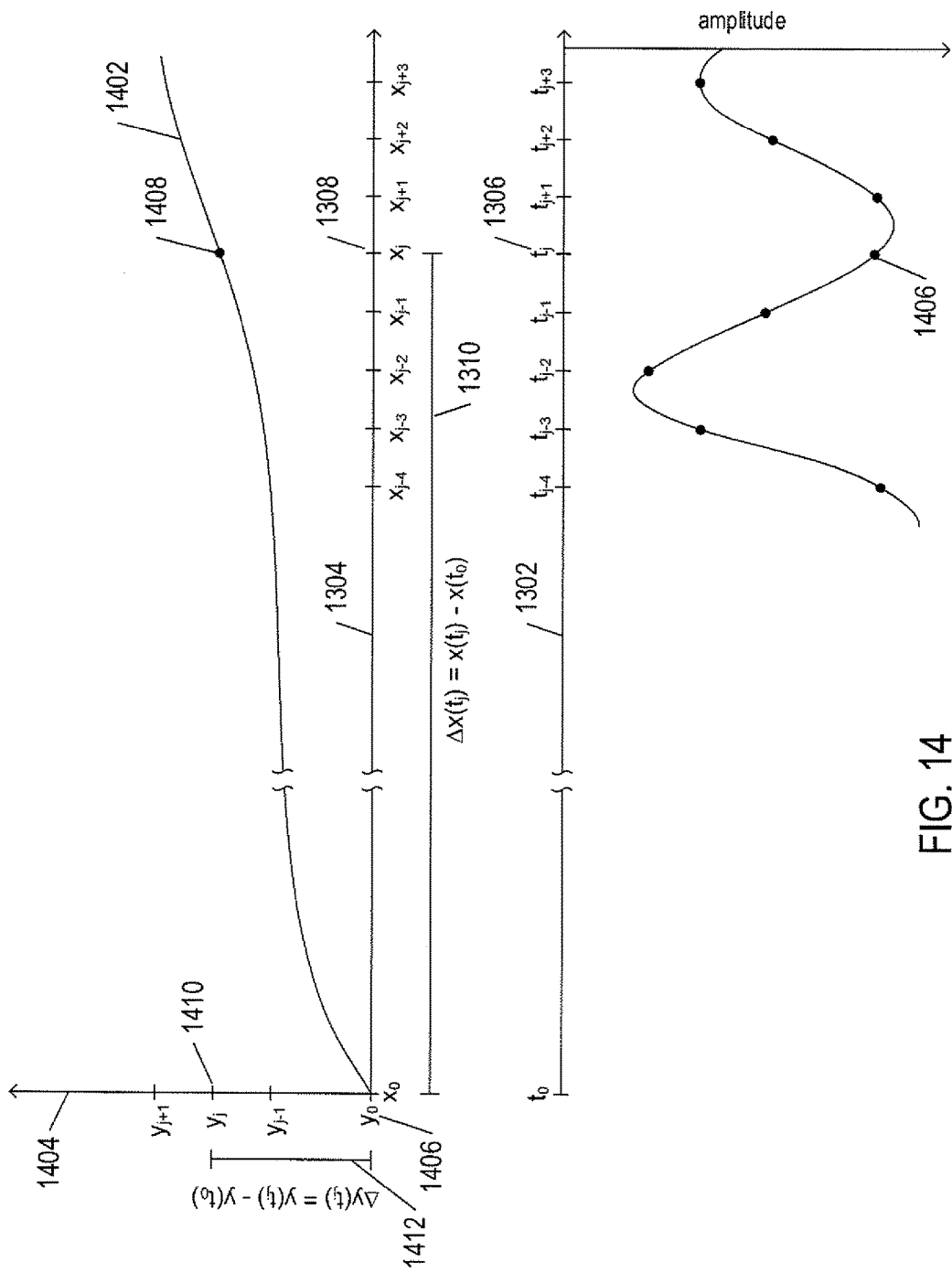
FIG. 14 shows calculation of distances a receiver has moved in two-dimensions relative to a start time and start position of the near-continuous wavefield.

FIG. 14 shows calculation of distances a receiver has moved in the x- and y-directions relative to the start time and start position of the near-continuous wavefield shown in FIG. 11. In this example, curve 1402 represents a plot of a non-linear path a receiver has moved along a vessel track over the same time axis 1302 with the x-coordinate axis 1304 described above with reference to FIG. 13 and a y-coordinate axis 1404 to account for the receivers location in the y-direction. Point $(x_0, y_0)$ 1406 represents the initial coordinate location of the receiver at start time $t_0$. Each recorded amplitude has a corresponding time sample and x- and y-coordinate location of the receiver along the curve 1402. For example, amplitude 1206 was measured at time sample $t_j$ 1306 when the receiver was at a point 1408 with x-coordinate $x_j$ 1308 and y-coordinate $y_j$ 1410. Lines 1310 and 1412 represent the x- and y-distances the receiver has moved, respectively, at time sample $t_j$ relative to the receiver's initial coordinate location $(x_0, y_0)$ 1406 when near-continuous recording began. The distance the receiver has moved in the x-direction since the start of near-continuous recording is given by Equation (15) and the distance the receiver has moved in the y-direction since the start of near-continuous recording is given by:

$$\Delta y(t_j) = y_j - y_0 \quad (19)$$

The distances given by Equations (15) and (19) are calculated for each receiver with respect to each receiver's initial location when recording began.

The near-continuous wavefield, or each component wavefield, is transformed from the space-time ("s-t") domain to the wavenumber-time ("k-t") domain using an FFT or a DFT:

$$c_r(x_j,y_j,t_j) \to C_r(k_x,k_y,t_j) \quad (20)$$

A two-dimensional distance correction relative to the start time and start positon of recording the near-continuous wavefield is given by the following distance-correction operator:

$$O(k_x,k_y,t) = e^{-i(k_x \Delta x(t) + k_y \Delta y(t))} \quad (21)$$

For a two-dimensional vessel track, the distance-correction operator is applied to each time sample of each trace of the near-continuous wavefield, or each component wavefield, as follows:

$$C_r(k_x,k_y,t_j)O(k_x,k_y,t_j) = C_r(k_x,k_y,t_j)e^{-i(k_x \Delta x(t) + k_y \Delta y(t))} \quad (22)$$

A distance-correction operator represented by Equation (21) is applied to each time sample of each trace of a near-continuous wavefield based on the distances $\Delta x(t_j)$ and $\Delta y(t_j)$ the receiver has moved since the beginning of recording the near-continuous wavefield.

The following pseudo-code represents applying the distance-correction operator in Equation (17) to a near-continuous wavefield obtained for a linear vessel track in the k-t domain:

```
1   for each k_x {
2       for (r = 1; r <=R; r++) {           \\ r is the trace index
3           for (m = 1; m <=M; m++) {       \\ m is the time sample index
4               read (C_r(k_x, t_m));
5               Δx(t_m) = x_m - x_0;
6               C_r(k_x, t_m) = C_r(k_x, t_m)e^{-ik_x Δx(t^m)};
7           }
8       }
9   }
```

The following pseudo-code represents applying the distance-correction operator in Equation (21) to a near-continuous wavefield obtained for a non-linear vessel track in the k-t domain:

```
1    for each (k_x, k_y) {
2        for (r = 1; r <=R; r++) {          \\ r is the trace index
3            for (m = 1; m <=M; m++) {      \\ m is the time sample index
4                read (C_r(k_x, k_y, t_m));
5                Δx(t_m) = x_m - x_0;
6                Δy(t_m) = y_m - y_0;
7                C_r(k_x, k_y, t_m) = C_r(k_x, k_y, t_m)e^{-i(k^x Δx(t^m) + k^y Δy(t^m))};
8            }
9        }
10   }
```

The common-receiver traces may be transformed back from the k-t domain to the s-t domain and collected to form a near-continuous wavefield in approximately stationary-receiver locations. Each trace of a near-continuous wavefield in approximately stationary-receiver locations is called a "common-receiver trace" composed of seismic data recorded for an approximately stationary-receiver location. The term "stationary-receiver location" does not imply that a stationary receiver was used to measure the seismic data contained in a common-receiver trace. Because the receivers are moving during seismic data recording as explained above, a number of traces of the near-continuous wavefield may contain seismic data measured at about the same location. The distance-correction operators of Equations (17) and (21) apply a spatial correction to traces of the near-continuous wavefield to form common-receiver traces of a near-continuous wavefield in approximately stationary-receiver locations. Each common-receiver trace contains the seismic data measured at about the same location by one or more receivers as if a stationary receiver had instead been placed at the location. The tem "stationary-receiver location" refers to the location where seismic data is measured by one or more receivers as the receivers pass over the location and a common-receiver trace is a collection of that seismic data.

Figure 15:
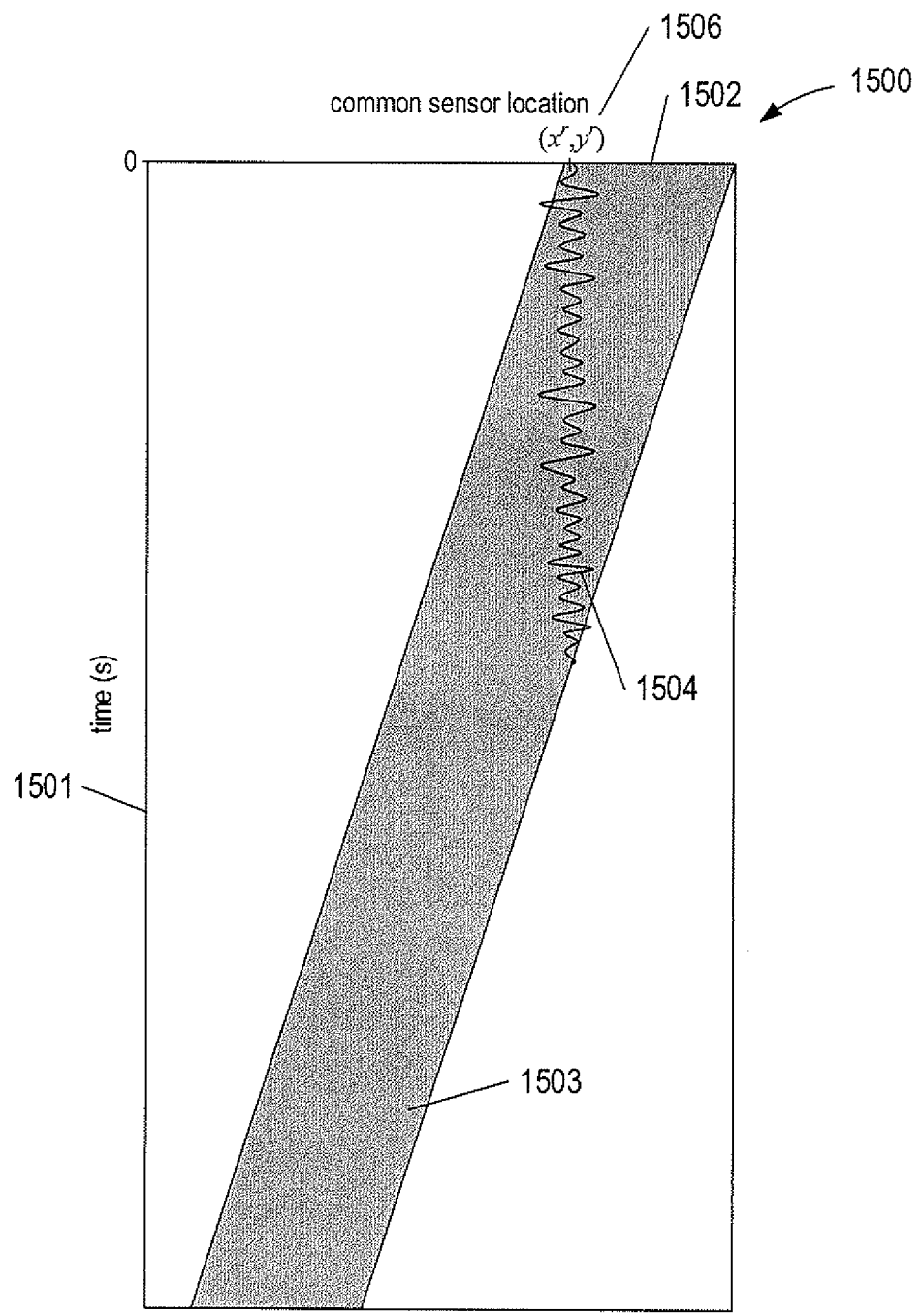
FIG. 15 shows an example near-continuous wavefield in approximately stationary-receiver locations.

FIG. 15 shows an example near-continuous wavefield in approximately stationary-receiver locations obtained from applying a distance-correction operator to a near-continuous wavefield as described above with reference to Equations (15)-(22). Vertical axis 1501 represents time and horizontal axis 1502 represents approximately stationary-receiver locations. Shaded region 1503 is composed of traces associated with approximately stationary-receiver locations. Unshaded portions of the gather 1500 do not contain seismic data. For example, a wiggle curve 1504 represents a common-receiver trace associated with an approximately stationary-receiver location (x$^r$, y$^r$) 1506. The common-receiver trace 1504 is composed of seismic data measured by one or more pressure or particle motion sensors at the approximately stationary-receiver location (x$^r$, y$^r$). In other words, the common-receiver trace 1504 contains the seismic data that would have been measured by a approximately stationary pressure or particle motion sensor placed at the location (x$^r$, y$^r$).

The distance-correction operators given by Equations (17) and (21) may be applied to the full near-continuous wavefield in order to obtain a near-continuous wavefield in approximately stationary-receiver locations. Alternatively, because the near-continuous wavefield may be large and, as a result, stored as a series of component seismic data-records in a data-storage device as described above with reference to FIG. 11, the distance-correction operators may be applied to each component wavefield to compute component wavefield in approximately stationary-receiver locations that are concatenated to produce the near-continuous wavefield in approximately stationary-receiver locations.

Figure 16:
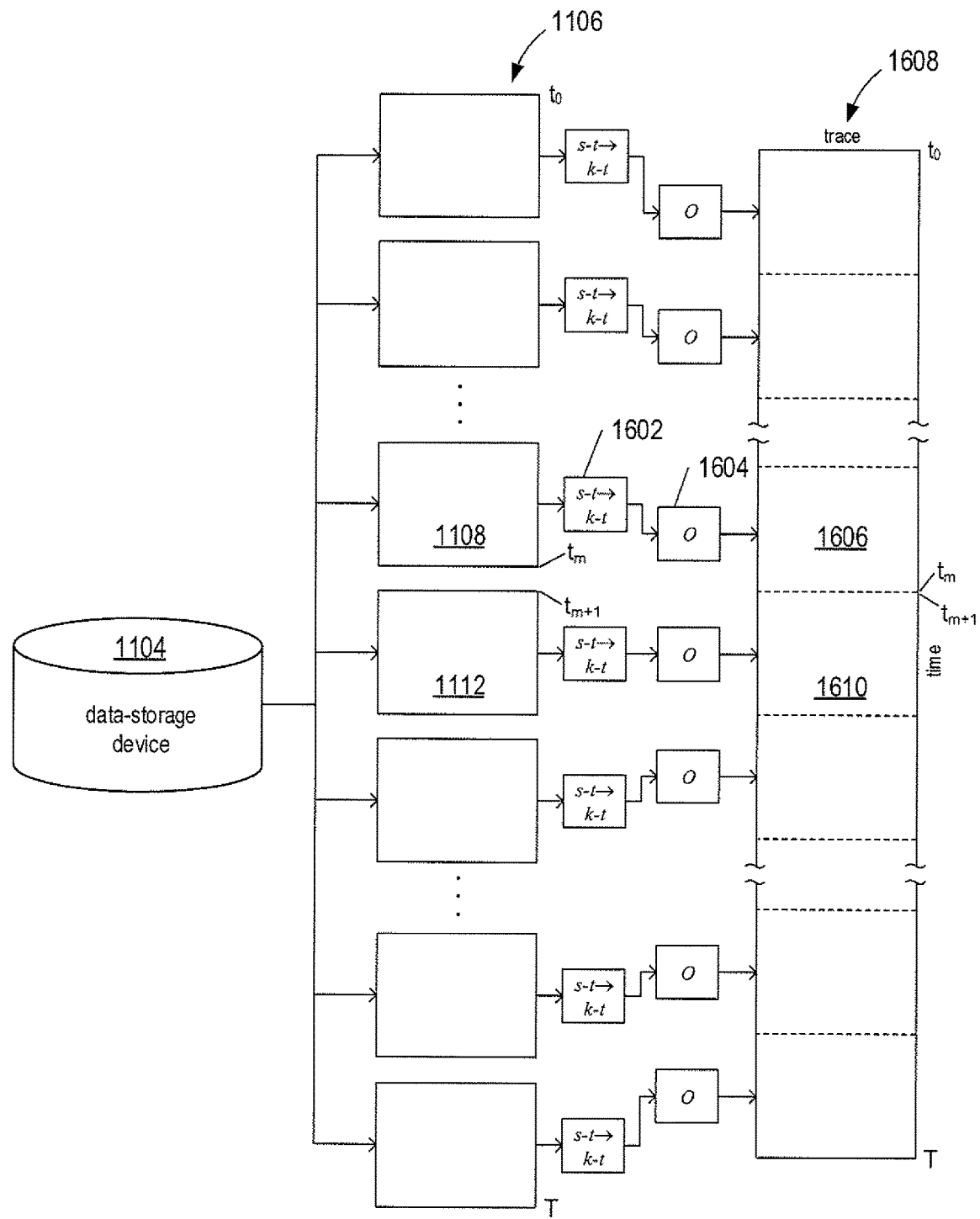
FIG. 16 shows the series of component wavefields corrected for receiver movement.

FIG. 16 shows the series of component wavefields 1106 of the near-continuous wavefield 1102, shown in FIG. 11, corrected for receiver movement to obtain a near-continuous wavefield in approximately stationary-receiver locations. In the example of FIG. 16, each component wavefield is read from the data-storage device 1104, transformed from the s-t domain to the k-t domain, and a distance-correction operator, denoted by "O," is applied to obtain a component wavefield in approximately stationary-receiver locations. For example, component wavefield 1106 is read from the data-storage device 1104. The component wavefield 1106 is transformed at 1602 from the s-t domain to the k-t domain using a FFT or a DFT. A distance-correction operator is applied 1604 to the transformed component wavefield in order to obtain a component wavefield in approximately stationary-receiver locations 1606. For example, when the component wavefields are obtained from a substantially linear vessel track, the distance-correction operator applied is represented by Equation (17). On the other hand, when the component wavefields are obtained from a non-linear vessel track, the distance-correction operator applied is represented by Equation (21). The component wavefields in approximately stationary-receiver locations are concatenated in time-order to obtain a near-continuous wavefield in approximately stationary-receiver locations 1608. For example, a component wavefield in approximately stationary-receiver locations 1610 is concatenated with the component wavefield in approximately stationary-receiver locations 1606 such that the amplitudes with time sample $t_{m+1}$ of component wavefield in approximately stationary-receiver locations 1610 are adjacent in time to amplitudes with time sample $t_m$ of component wavefield in approximately stationary-receiver locations 1606.

Wavefield separation, as described above with reference to Equations (6) and (8), may not be applied to a near-continuous pressure wavefield, a near-continuous particle velocity wavefield, or a near-continuous particle acceleration wavefield. But wavefield separation may be applied to a near-continuous pressure wavefield in approximately stationary-receiver locations, near-continuous particle displacement wavefield in stationary-receiver locations, near-continuous vertical-velocity wavefield in stationary-receiver locations, and near-continuous particle acceleration wavefield in approximately stationary-receiver locations.

In order to apply wavefield separation to a near-continuous particle acceleration wavefield in approximately stationary-receiver locations, Equations (6)-(8) may be modified using the following relationship:

$$i\omega V_z(k_x,k_y,\omega|z_r) = A_z(k_x,k_y,\omega|z_r) \qquad (23)$$

where $A_z$ represents the vertical particle acceleration in the k-f domain.

Equation (9) may be modified to compute an estimated vertical-acceleration wavefield over a low-frequency range from the pressure wavefield as follows:

$$A'_z(k_x, k_y, \omega | z_r) = -\frac{ik_z}{\rho} \frac{(1 - Re^{-i2z_rk_z})}{(1 + Re^{-i2z_rk_z})} P(k_x, k_y, \omega | z_r) \qquad (24)$$

In order to apply wavefield separation to a near-continuous particle displacement wavefield in approximately stationary-receiver locations, Equations (6)-(8) may be modified using the following relationship:

$$\frac{-i}{\omega} V_z(k_x, k_y, \omega | z_r) = G_z(k_x, k_y, \omega | z_r) \qquad (25)$$

where $G_z$ represents the vertical particle displacement in the k-f domain.

Equation (9) may also be modified to compute an estimated particle displacement wavefield over a low-frequency range from the pressure wavefield as follows:

$$G'_z(k_x, k_y, \omega | z_r) = \frac{ik_z\omega^2}{\rho} \frac{(1 - Re^{-i2z_rk_z})}{(1 + Re^{-i2z_rk_z})} P(k_x, k_y, \omega | z_r) \qquad (26)$$

Figure 17:
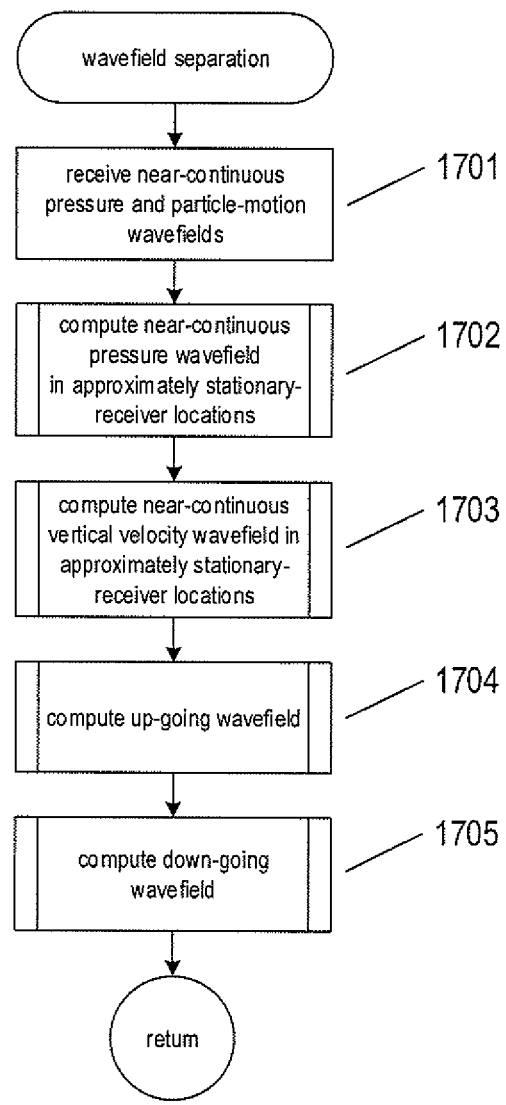
FIG. 17 shows a control-flow diagram of a wavefield separation method applied to near-continuous pressure and particle motion wavefields.

FIG. 17 shows a control-flow diagram of a wavefield separation method applied to near-continuous pressure and particle motion wavefields. In block 1701, a near-continuous pressure wavefield and a corresponding near-continuous particle motion wavefield are received, as described above with reference to FIGS. 11 and 12. The term "particle motion wavefield" is used to refer to a particle displacement wavefield, particle-velocity wavefield, or particle-acceleration wavefield. In block 1702, a routine "compute near-continuous pressure wavefield in approximately stationary-receiver locations" is called in block 1701. In block 1703, a routine "compute near-continuous particle motion wavefield in approximately stationary-receiver locations" is called in block 1701. Blocks 1704 and 1705 represent wavefield separation performed on either the pressure or particle motion wavefield in approximately stationary-receiver locations. In block 1704, a routine "compute up-going wavefield" is called to compute an up-going wavefield of either the pressure wavefield or particle motion wavefield in approximately stationary-receiver locations. In block 1705, a routine "compute down-going wavefield" is called to compute a down-going wavefield of either the pressure wavefield or the particle motion wavefield in approximately stationary-receiver locations.

Figure 18:
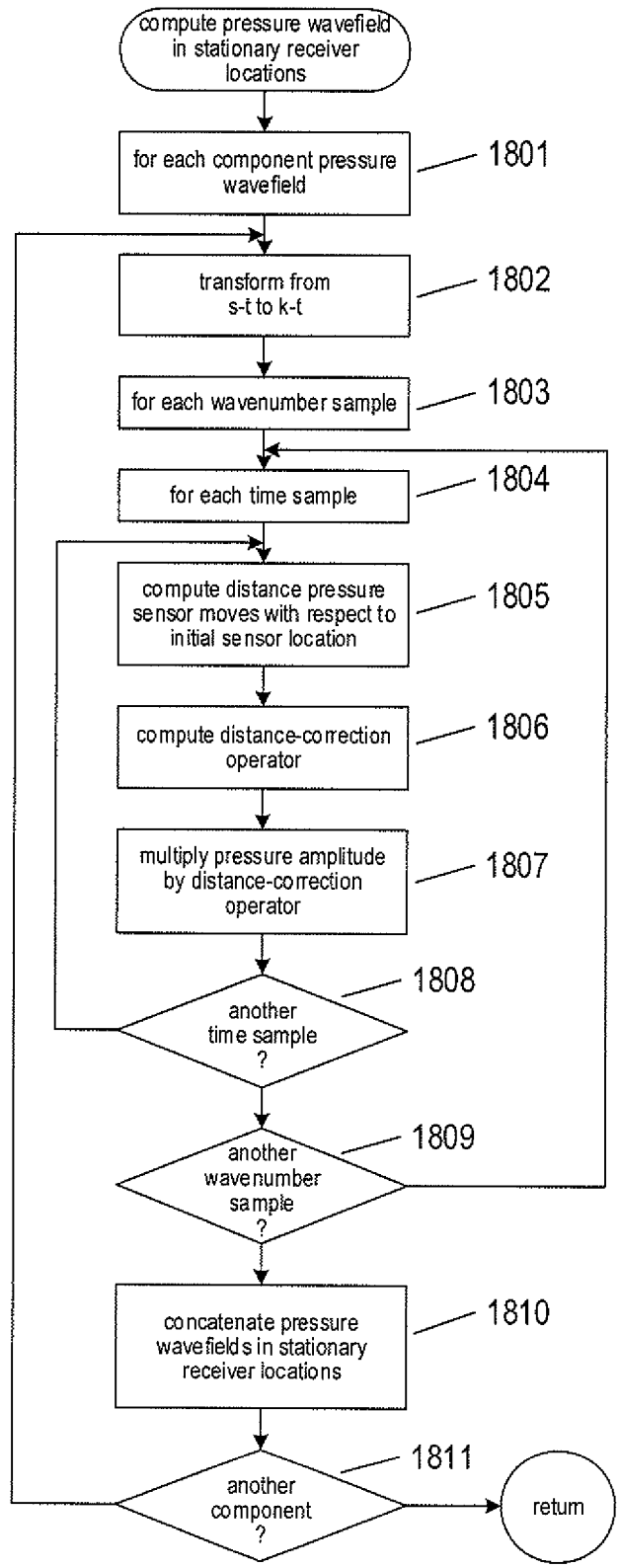
FIG. 18 shows a control-flow diagram of the routine "compute near-continuous approximately stationary-sensor pressure wavefield" called in FIG. 17.

FIG. 18 shows a control-flow diagram of the routine "compute near-continuous pressure wavefield in approximately stationary-receiver locations" called in block 1702 of FIG. 17. This control-flow diagram presents a method for processing a near-continuous pressure wavefield that has been stored as a series of component pressure wavefields as described above with reference to FIG. 12. A near-continuous pressure wavefield in approximately stationary-receiver locations may be computed from a near-continuous pressure wavefield stored as a data structure by omitting the operations associated with blocks 1801 and block 1810. The for-loop beginning with block 1801 repeats the operations of blocks 1802-1810 for each component pressure wavefield stored in a data-storage device as described above with reference to FIG. 12. In block 1802, the wavefield is transformed from the s-t domain to the k-t domain as described above with reference to Equation (16) when the component pressure wavefield is obtained from a linear vessel track or as described above with reference to Equation (20) when the component pressure wavefield is obtained from a non-linear vessel track. The for-loop beginning with block 1803 repeats the operations of blocks 1804-1808 for each wavenumber sample in the component pressure wavefield. The for-loop beginning with block 1804 repeats the operations of blocks 1805-1807 for each time sample. In block 1805, distance a pressure sensor has moved with respect to the initial sensor location is computed according to Equations (15) and (19) for wavefields generated from a non-linear vessel track. In block 1806, a distance-correction operator is computed according to Equation (21). In block 1807, a pressure amplitude is multiplied by the distance-correction operator as described above with reference to Equations (22). In decision block 1808, the operations represented by blocks 1805-1807 are repeated for another time sample, otherwise control flows to decision block 1809. In decision block 1809, the operations represented by blocks 1804-1808 are repeated for another wavenumber sample, otherwise, control flows to block 1810. In block 1810, the component pressure wavefields in approximately stationary-receiver locations are concatenated as described above with reference to FIG. 16. In decision block 1810, the operation represented by blocks 1802-1810 are repeated for another component pressure wavefield.

Figure 19:
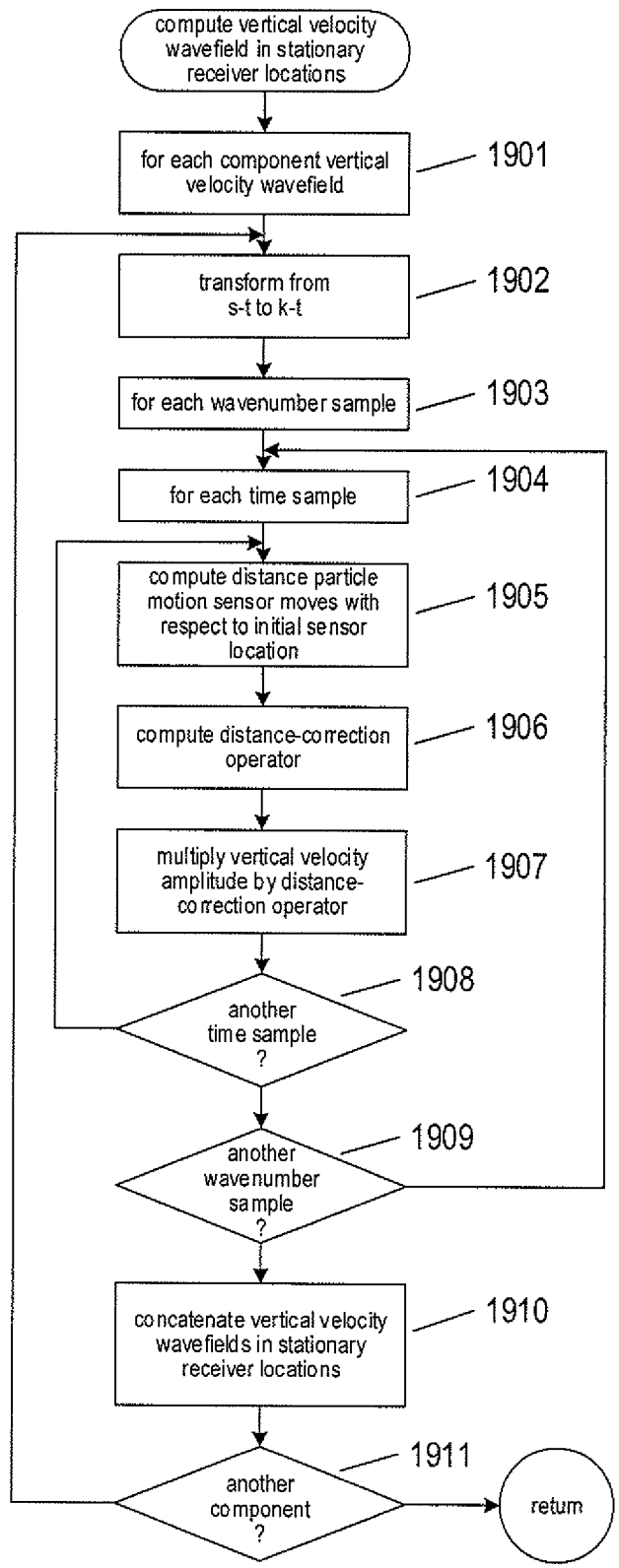
FIG. 19 shows a control-flow diagram of the routine "compute near-continuous approximately stationary-sensor particle motion wavefield" called in FIG. 17.

FIG. 19 shows a control-flow diagram of the routine "compute near-continuous particle motion wavefield in approximately stationary-receiver locations" called in block 1702 of FIG. 17. This control-flow diagram presents a method for processing a near-continuous particle motion wavefield that has been stored as a series of component particle motion wavefields as described above with reference to FIG. 12. A near-continuous particle motion wavefield in approximately stationary-receiver locations may be computed from a near-continuous particle motion wavefield stored as a data structure by omitting the operations associated with blocks 1901 and block 1910. The for-loop beginning with block 1901 repeats the operations of blocks 1902-1910 for each component particle motion wavefield stored in a data-storage device as described above with reference to FIG. 12. In block 1902, the wavefield is transformed from the s-t domain to the k-t domain as described above with reference to Equation (16) when the component particle motion wavefield is obtained from a linear vessel track or as described above with reference to Equation (20) when the component particle motion wavefield is obtained from a non-linear vessel track. The for-loop beginning with block 1903 repeats the operations of blocks 1904-1908 for each wavenumber sample in the component particle motion wavefield. The for-loop beginning with block 1904 repeats the operations of blocks 1905-1907 for each time sample. In block 1905, distance a particle motion sensor has moved with respect to the initial sensor location is computed according to Equations (15) and (19) for wavefields generated from a non-linear vessel track. In block 1906, a distance-correction operator is computed according to Equation (21). In block 1907, a vertical-particle-velocity amplitude is multiplied by the distance-correction operator as described above with reference to Equations (22). In decision block 1908, the operations represented by blocks 1905-1907 are repeated for another time sample, otherwise control flows to decision block 1909. In decision block 1909, the operations represented by blocks 1904-1908 are repeated for another wavenumber sample, otherwise, control flows to block 1910. In block 1910, the component particle motion wavefields in approximately stationar-receiver locations are concatenated as described above with reference to FIG. 16. In decision block 1911, the operation represented by blocks 1902-1910 are repeated for another component particle motion wavefield.

Figure 20:
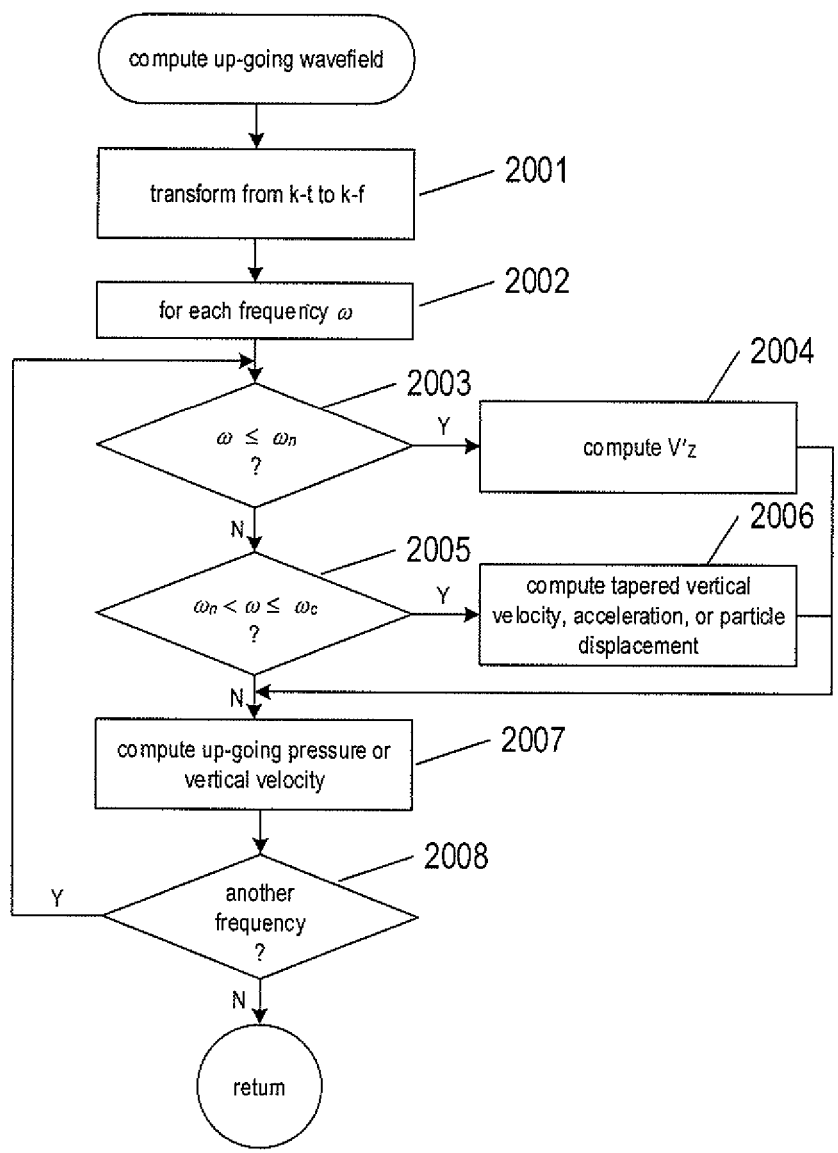
FIG. 20 shows a control-flow diagram of the routine "compute up-going wavefield" called in FIG. 17.

FIG. 20 shows a control-flow diagram of the routine "compute up-going wavefield" called in block 1704 of FIG. 17. In block 2001, the distance-correction, near-continuous pressure and particle motion wavefields computed in blocks 1702 and 1703, respectively, are transformed from the k-t domain to the k-f domain. The for-loop beginning with block 2002 repeats the operations of blocks 2003-2008 for each frequency in the frequency domain of the wavefields. In decision block 2003, when the frequency $\omega$ is less than or equal to the frequency $\omega_n$ as described above with reference to Equation (10) control flows to block 2004, otherwise control flows to decision block 2005. In block 2004, the vertical-particle-velocity, vertical-particle acceleration, or vertical particle displacement is computed according to Equations (9), (24), or (26). In decision block 2005, when the frequency $\omega$ is greater than the frequency $\omega$, and less than the frequency $\omega$, as described above with reference to Equation (10) control flows to block 2006, otherwise control flows to block 2007. In block 2006, a tapered vertical-particle-velocity is computed using low- and high-pass filters as described above with reference to Equations (10)-(12), or tapered vertical-particle acceleration or tapered vertical particle displacement using Equation (10)-(12) modified by Equations (23) and (25). In block 2007, an up-going pressure is computed according to Equation (6a) or an up-going vertical-particle-velocity is computed according to Equation (8a) or up-going vertical-particle acceleration or up-going vertical particle displacement computed according to Equation (8a) modified using Equations (23) and (25). In decision block 2008, when another frequency is available, the operations of blocks 2002-2007 are repeated.

Figure 21:
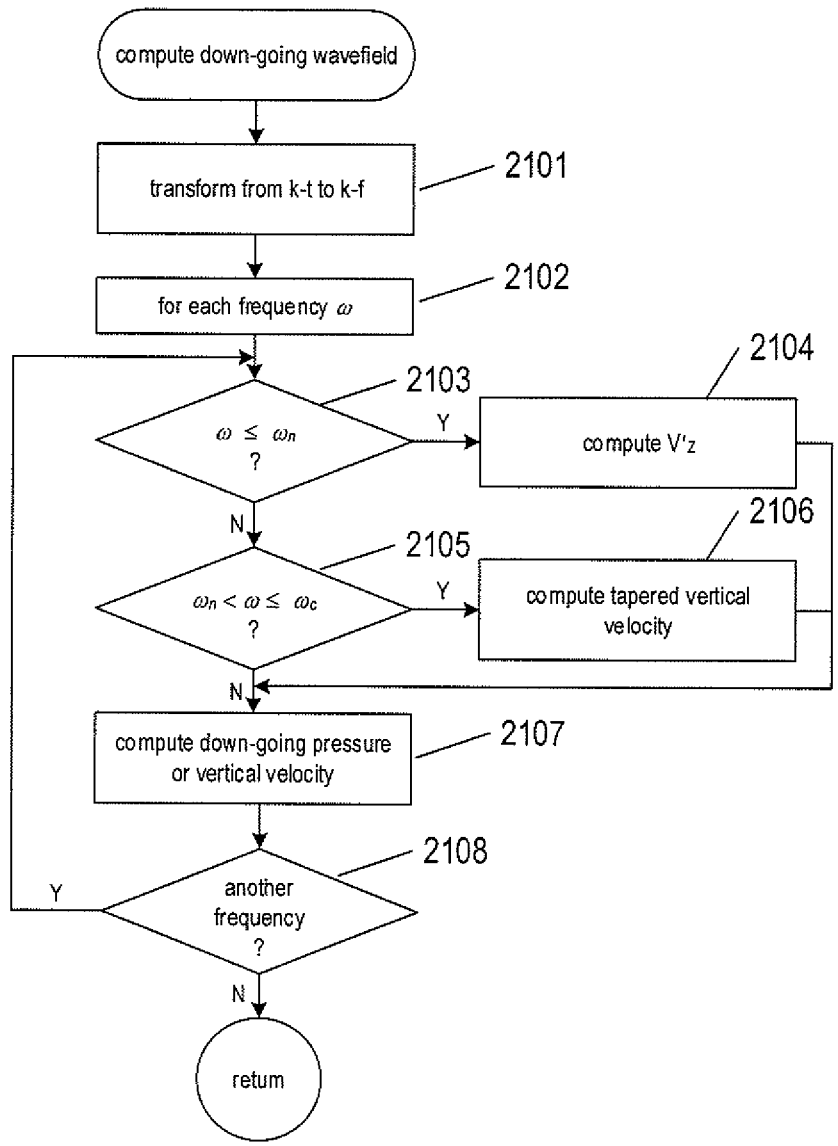
FIG. 21 shows a control-flow diagram of the routine "compute down-going wavefield" called in FIG. 17.

FIG. 21 shows a control-flow diagram of the routine "compute down-going wavefield" called in block 1704 of FIG. 17. In block 2101, the distance-correction, near-continuous pressure and particle motion wavefields computed in blocks 1702 and 1703, respectively, are transformed from the k-t domain to the k-f domain. The for-loop beginning with block 2102 repeats the operations of blocks 2103-2108 for each frequency in the frequency domain of the wavefields. In decision block 2103, when the frequency $\omega$ is less than or equal to the frequency $\omega$, as described above with reference to Equation (10) control flows to block 2104, otherwise control flows to decision block 2105. In block 2104, the vertical-particle-velocity, vertical-particle acceleration, or vertical particle displacement is computed according to Equations (9), (24), or (26). In decision block 2105, when the frequency $\omega$ is greater than the frequency $\omega_n$ and less than the frequency $\omega_c$ as described above with reference to Equation (10) control flows to block 2106, otherwise control flows to block 2107. In block 2106, a tapered vertical-particle-velocity is computed using low- and high-pass filters as described above with reference to Equations (10)-(12), or tapered vertical-particle acceleration or tapered vertical particle displacement using Equation (10)-(12) modified by Equations (23) and (25). In block 2107, a down-going pressure is computed according to Equation (6b) or a down-going vertical-particle-velocity is computed according to Equation (8b) or down-going vertical-particle acceleration or down-going vertical particle displacement computed according to Equation (8b) modified using Equations (23) and (25). In decision block 2108, when another frequency is available, the operations of blocks 2102-2107 are repeated.

Figure 22A:
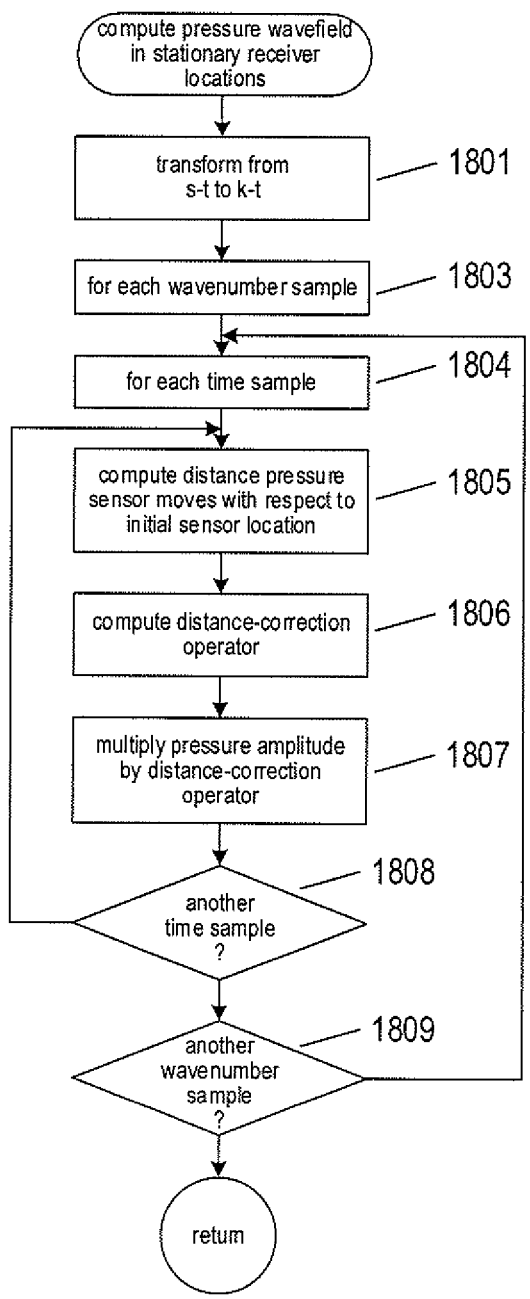
FIGS. 22A-22B show control-flow diagrams of routines "compute near-continuous approximately stationary-sensor pressure wavefield" and "compute near-continuous approximately stationary-sensor particle motion wavefield" called in FIG. 17.
Figure 22B:
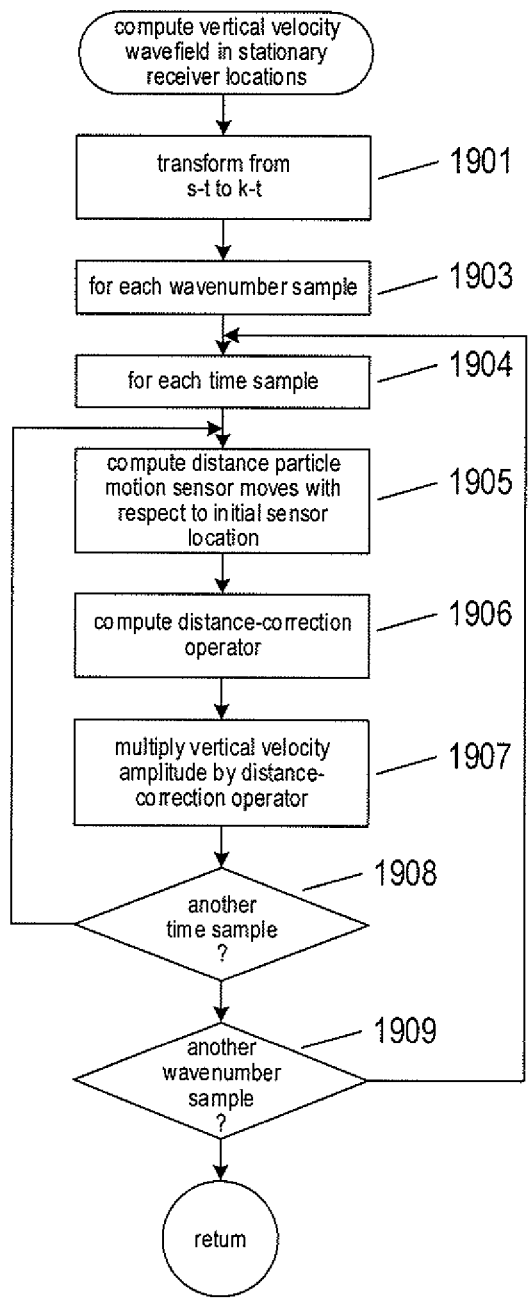

In alternative implementations, when near-continuous pressure and particle motion wavefields are stored as single data structures rather than component wavefields, methods of computing pressure and particle motion wavefields in approximately stationary-receiver locations described above with reference to FIGS. 18 and 19 are implemented as shown in FIGS. 22A and 22B, respectively. FIG. 22A shows a routine "compute near-continuous pressure wavefield in approximate stationary-receiver locations" called in block 1702 of FIG. 17 when the near-continuous pressure wavefield is not stored in component wavefields. The routine in FIG. 22A is similar to the routine shown in FIG. 18 with blocks 1801, 1810, and 1811 omitted. FIG. 22B shows a routine "compute near-continuous particle motion wavefield in approximate stationary-receiver locations" called in block 1703 of FIG. 17 when the near-continuous pressure wavefield is not stored in component wavefields. The routine in FIG. 22B is similar to the routine shown in FIG. 19 with blocks 1901, 1910, and 1911 omitted.

Figure 23:
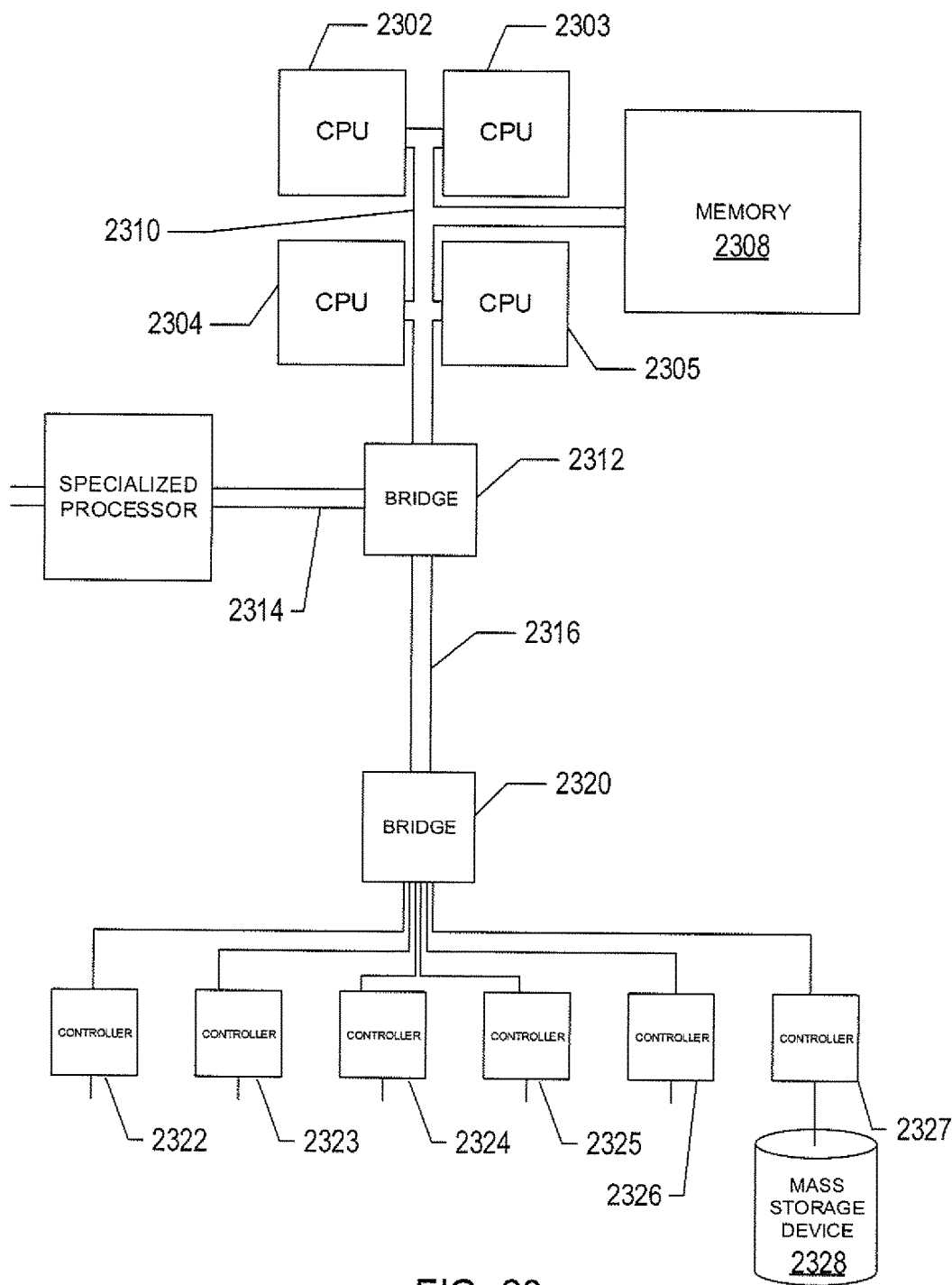
FIG. 23 shows an example of a generalized computer system that executes efficient methods of wavefield separation applied to near-continuous wavefields.

FIG. 23 shows an example of a generalized computer system that executes efficient methods of wavefield separation applied to near-continuous wavefields and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2302-2305, one or more electronic memories 2308 interconnected with the CPUs by a CPU/memory-subsystem bus 2310 or multiple busses, a first bridge 2312 that interconnects the CPU/memory-subsystem bus 2310 with additional busses 2314 and 2316, or other types of high-speed interconnection media, including multiple, high-speed serial interconnects. The busses or serial interconnections, in turn, connect the CPUs and memory with specialized processors, such as a graphics processor 2318, and with one or more additional bridges 2320, which are interconnected with high-speed serial links or with multiple controllers 2322-2327, such as controller 2327, that provide access to various different types of computer-readable media, such as computer-readable medium 2328, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2328 is a data-storage device, including electronic memory, optical or magnetic disk drive, USB drive, flash memory and other such data-storage device. The computer-readable medium 2328 can be used to store machine-readable instructions that encode the computational methods described above and can be used to store encoded data, during store operations, and from which encoded data can be retrieved, during read operations, by computer systems, data-storage systems, and peripheral devices.

Figure 24:
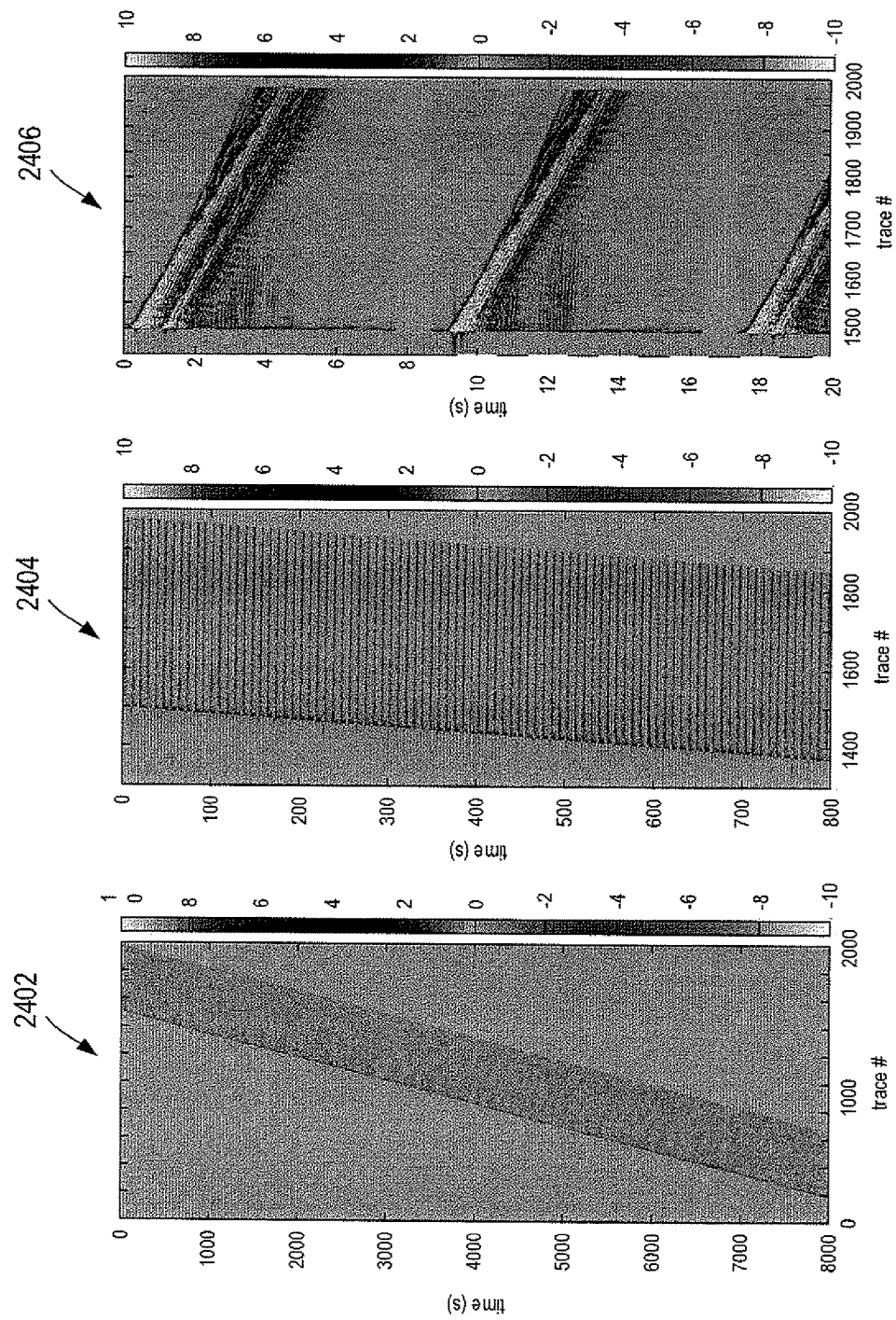
FIG. 24 shows a near-continuous seismic-data records of a pressure wavefield with approximately stationary receiver locations.

FIG. 24 shows a seismic-data record of a near-continuous pressure wavefield in approximately stationary-receiver locations. The pressure wavefield in approximately stationary-receiver locations was corrected using the in-line distance-correction operation of Equation (16). Both the seismic data and the positions used to compute the distances the receivers moved as a function of time were obtained from actual measurements obtained in a marine survey. Methods and systems described above were used to correct for the motion of the receivers in actual towed streamer seismic data in order to compute a wavefield with approximately stationary-receiver locations. Record 2402 displays the near-continuous pressure wavefield from one seismic line concatenated into one long, full near-continuous pressure wavefield in approximately stationary-receiver locations obtained from a linear vessel track that took about 2 hours, 13 minutes, and 20 seconds to complete. Record 2404 shows a portion of the full near-continuous pressure wavefield in approximately stationary-receiver locations for the first about 13 minutes and 20 seconds, and record 2406 shows a portion of the full near-continuous pressure wavefield in approximately stationary-receiver locations for the first about 20 seconds.

The mathematical equations and gathers presented above are not, in any way, intended to mean or suggest an abstract idea or concept. Instead the mathematical equations and gathers described above represent actual physical and concrete concepts and properties of materials that are in existence. The mathematical equations and methods described above are ultimately implemented on physical computer hardware, data-storage devices, and communications systems in order to obtain results that also represent physical and concrete concepts of materials that are in existence. For example, as explained above, an actual pressure wavefield emanating from an actual subterranean formation after being illuminated with an acoustic signal is composed of actual physical pressure waves that are sampled using physical and concrete pressure and particle motion sensors. The pressure sensors in turn produce physical electrical or optical signals that encode pressure data that is physically recorded on physical data-storage devices and undergoes computational processing using hardware as describe above to obtain up-going wavefield data that represents physical and concrete up-going pressure and/or vertical-particle-velocity wavefields. The up-going wavefield data may be displayed, or subjected to further geophysical data processing, in order to interpret the physical structure and composition of the subterranean formation, such as in monitoring production of or locating, an actual hydrocarbon deposit within the subterranean formation.

The method described above may be implemented in real time while a survey is being conducted or subsequent to completion of the survey. The pressure and vertical-particle-velocity wavefields and up-going and down-going wavefields computed as described above, or any combination thereof, may form a geophysical data product indicative of certain properties of a subterranean formation. The geophysical data product may include processed seismic geophysical data and may be stored on a computer-readable medium as described above. The geophysical data product may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

Although the above disclosure has been described in terms of particular implementations, it is not intended that the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters. Thus, the present disclosure is not intended to be limited to the implementations shown herein but is to be accorded the widest scope consistent with the principles and novel features disclosed herein.

The invention claimed is:

1. In a process for generating an image of a subterranean formation using marine seismic techniques in which one or more sources are activated to generate acoustic energy that is reflected from the subterranean formation and recorded by moving pressure and particle motion sensors, the specific improvement comprising:
computing a near-continuous pressure wavefield in approximately stationary-receiver locations from a recorded near-continuous pressure wavefield recorded by the pressure sensors and distances the pressure sensors moved since starting near-continuous recording of the near-continuous pressure wavefield;
computing a near-continuous particle motion wavefield in the approximately stationary-receiver locations from a recorded near-continuous particle motion wavefield recorded by the particle motion sensors and distances the particle motion sensors moved since starting near-continuous recording of the near-continuous particle motion wavefield;
computing one of an up-going near-continuous pressure or particle motion wavefield in approximately stationary-receiver locations based on the recorded near-continuous pressure and particle motion wavefields in the approximately stationary-receiver locations; and
using one of the up-going pressure or particle motion wavefields to generate an image of the subterranean formation, thereby avoiding contamination of the image from ghost effects created by down-going near-continuous pressure and particle motion wavefields in the recorded pressure and particle motion wavefields.

2. The process of claim 1 wherein computing the near-continuous pressure wavefield in the approximately stationary-receiver locations comprises:
transforming the recorded near-continuous pressure wavefield from a space-time domain to a wavenumber-time domain;
for each wavenumber sample of the recorded near-continuous pressure wavefield, and
for each time sample of a trace of the recorded near-continuous pressure wavefield,
computing the distance a pressure sensor moved along the vessel track with respect to an initial pressure sensor location;
computing a distance-correction operator based on the distance; and
multiplying a pressure amplitude at the time sample by the distance-correction operator.

3. The process of claim 1 wherein computing the near-continuous pressure wavefield in the approximately stationary-receiver locations comprises:
for each component pressure wavefield of the recorded near-continuous pressure wavefield in the approximately stationary-receiver locations,
transforming the component pressure wavefield from a space-time domain to a wavenumber-time domain;
for each wavenumber sample of the recorded near-continuous pressure wavefield, and
for each time sample of a trace of the recorded near-continuous pressure wavefield,
computing the distance a pressure sensor moved along the vessel track with respect to an initial pressure sensor location;
computing a distance-correction operator based on the distance; and
multiplying a pressure amplitude at the time sample by the distance-correction operator.

4. The process of claim 1 wherein computing the near-continuous particle motion wavefield in the approximately stationary-receiver locations comprises:
transforming the recorded near-continuous particle motion wavefield from a space-time domain to a wavenumber-time domain;
for each wavenumber sample of the recorded near-continuous particle motion wavefield, and
for each time sample of a trace of the recorded near-continuous particle motion wavefield,
computing the distance a particle motion sensor moved along the vessel track with respect to an initial pressure sensor location;
computing a distance-correction operator based on the distance; and
multiplying a vertical-particle-velocity amplitude at the time sample by the distance-correction operator.

5. The process of claim 1 wherein computing the near-continuous particle motion wavefield in the approximately stationary-receiver locations comprises:
for each component pressure wavefield of the recorded near-continuous particle motion wavefield in the approximately stationary-receiver locations,
transforming the component particle motion wavefield from a space-time domain to a wavenumber-time domain;
for each wavenumber sample of the recorded near-continuous particle motion wavefield, and
for each time sample of a trace of the recorded near-continuous particle motion wavefield,
computing the distance a particle motion sensor moved along the vessel track with respect to an initial pressure sensor location;
computing a distance-correction operator based on the distance; and
multiplying a vertical-particle-velocity amplitude at the time sample by the distance-correction operator.

6. The process of claim 1 wherein computing one of the up-going pressure or particle motion wavefield in the approximately stationary-receiver locations further comprises:
transforming the recorded near-continuous pressure and particle motion wavefields in the approximately stationary-receiver locations from the wavenumber-time domain to pressure and particle motion wavefields in the wavenumber-frequency domain;

computing an estimated particle motion wavefield over a low-frequency range based on pressure wavefield over the low-frequency range;

combining the estimated particle motion wavefield over the low-frequency range with the particle motion wavefields above to the low-frequency to generate a combined near-continuous particle motion wavefield in approximately stationary-receiver locations; and computing the up-going pressure or particle motion wavefield based on the near-continuous pressure wavefield in the approximately stationary-receiver locations and the combined near-continuous particle motion wavefield in approximately stationary-receiver locations.

7. The process of claim 1 executed on a programmable computer programmed to execute the method.

8. The process of claim 1 further comprises storing one of the up-going distance-corrected pressure or particle motion wavefield in one or more data-storage devices.

9. The process of claim 1, wherein at least one of the one of the up-going distance-corrected pressure or particle motion wavefield form a geophysical data product, further comprising recording the geophysical data product on a physical, non-volatile computer-readable medium suitable for importing onshore.

10. The process of claim 9, further comprising performing geophysical analysis onshore on the geophysical data product.

11. A computer system for generating an image of a subterranean formation, the system comprising:
one or more processors;
one or more data-storage devices; and
a routine stored in one or more of data-storage devices and executed by the one or more processors, the routine preforms the operations comprising:
computing a near-continuous pressure wavefield in approximately stationary-receiver locations from a recorded near-continuous pressure wavefield recorded by pressure sensors and distances the pressure sensors moved since starting near-continuous recording of the near-continuous pressure wavefield;
computing a near-continuous particle motion wavefield in the approximately stationary-receiver locations from a recorded near-continuous particle motion wavefield recorded by particle motion sensors and distances the particle motion sensors moved since starting near-continuous recording of the near-continuous particle motion wavefield;
computing one of an up-going near-continuous pressure or particle motion wavefield in approximately stationary-receiver locations based on the recorded near-continuous pressure and particle motion wavefields in the approximately stationary-receiver locations; and
using one of the up-going pressure or particle motion wavefields to generate an image of the subterranean formation, thereby avoiding contamination of the image from ghost effects created by down-going near-continuous pressure and particle motion wavefields in the recorded pressure and particle motion wavefields.

12. The computer system of claim 11 wherein computing the near-continuous pressure wavefield in the approximately stationary-receiver locations comprises:
transforming the recorded near-continuous pressure wavefield from a space-time domain to a wavenumber-time domain;
for each wavenumber sample of the recorded near-continuous pressure wavefield, and
for each time sample of a trace of the recorded near-continuous pressure wavefield,
computing the distance a pressure sensor moved along the vessel track with respect to an initial pressure sensor location;
computing a distance-correction operator based on the distance; and
multiplying a pressure amplitude at the time sample by the distance-correction operator.

13. The computer system of claim 11 wherein computing the near-continuous pressure wavefield in the approximately stationary-receiver locations comprises:
for each component pressure wavefield of the recorded near-continuous pressure wavefield in the approximately stationary-receiver locations,
transforming the component pressure wavefield from a space-time domain to a wavenumber-time domain;
for each wavenumber sample of the recorded near-continuous pressure wavefield, and
for each time sample of a trace of the recorded near-continuous pressure wavefield,
computing the distance a pressure sensor moved along the vessel track with respect to an initial pressure sensor location;
computing a distance-correction operator based on the distance; and
multiplying a pressure amplitude at the time sample by the distance-correction operator.

14. The computer system of claim 11 wherein computing the near-continuous particle motion wavefield in the approximately stationary-receiver locations comprises:
transforming the recorded near-continuous particle motion wavefield from a space-time domain to a wavenumber-time domain;
for each wavenumber sample of the recorded near-continuous particle motion wavefield, and
for each time sample of a trace of the recorded near-continuous particle motion wavefield,
computing the distance a particle motion sensor moved along the vessel track with respect to an initial pressure sensor location;
computing a distance-correction operator based on the distance; and
multiplying a vertical-particle-velocity amplitude at the time sample by the distance-correction operator.

15. The computer system of claim 11 wherein computing the near-continuous particle motion wavefield in the approximately stationary-receiver locations comprises:
for each component pressure wavefield of the recorded near-continuous particle motion wavefield in the approximately stationary-receiver locations,
transforming the component particle motion wavefield from a space-time domain to a wavenumber-time domain;
for each wavenumber sample of the recorded near-continuous particle motion wavefield, and
for each time sample of a trace of the recorded near-continuous particle motion wavefield,
computing the distance a particle motion sensor moved along the vessel track with respect to an initial pressure sensor location;
computing a distance-correction operator based on the distance; and multiplying a vertical-particle-velocity amplitude at the time sample by the distance-correction operator.

16. The computer system of claim 11 wherein computing one of the up-going pressure or particle motion wavefield in the approximately stationary-receiver locations comprises:
transforming the recorded near-continuous pressure and particle motion wavefields in the approximately stationary-receiver locations from the wavenumber-time domain to pressure and particle motion wavefields in the wavenumber-frequency domain;
computing an estimated particle motion wavefield over a low-frequency range based on pressure wavefield over the low-frequency range;
combining the estimated particle motion wavefield over the low-frequency range with the particle motion wavefields above to the low-frequency to generate a combined near-continuous particle motion wavefield in approximately stationary-receiver locations; and
computing the up-going pressure or particle motion wavefield based on the near-continuous pressure wavefield in the approximately stationary-receiver locations and the combined near-continuous particle motion wavefield in approximately stationary-receiver locations.

17. A non-transitory computer-readable medium having machine-readable instructions encoded thereon for enabling one or more processors of a computer system to generate an image of a subterranean formation by performing the operations comprising:
computing a near-continuous pressure wavefield in approximately stationary-receiver locations from a recorded near-continuous pressure wavefield recorded by pressure sensors and distances the pressure sensors moved since starting near-continuous recording of the near-continuous pressure wavefield;
computing a near-continuous particle motion wavefield in the approximately stationary-receiver locations from a recorded near-continuous particle motion wavefield recorded by particle motion sensors and distances the particle motion sensors moved since starting near-continuous recording of the near-continuous particle motion wavefield;
computing one of an up-going near-continuous pressure or particle motion wavefield in approximately stationary-receiver locations based on the recorded near-continuous pressure and particle motion wavefields in the approximately stationary-receiver locations; and
using one of the up-going pressure or particle motion wavefields to generate an image of the subterranean formation, thereby avoiding contamination of the image from ghost effects created by down-going near-continuous pressure and particle motion wavefields in the recorded pressure and particle motion wavefields.

18. The medium of claim 17 wherein computing the near-continuous pressure wavefield in the approximately stationary-receiver locations comprises:
transforming the recorded near-continuous pressure wavefield from a space-time domain to a wavenumber-time domain;
for each wavenumber sample of the recorded near-continuous pressure wavefield, and
for each time sample of a trace of the recorded near-continuous pressure wavefield,
computing the distance a pressure sensor moved along the vessel track with respect to an initial pressure sensor location;
computing a distance-correction operator based on the distance; and
multiplying a pressure amplitude at the time sample by the distance-correction operator.

19. The medium of claim 17 wherein computing the near-continuous pressure wavefield in the approximately stationary-receiver locations further comprises:
for each component pressure wavefield of the recorded near-continuous pressure wavefield in the approximately stationary-receiver locations,
transforming the component pressure wavefield from a space-time domain to a wavenumber-time domain;
for each wavenumber sample of the recorded near-continuous pressure wavefield, and
for each time sample of a trace of the recorded near-continuous pressure wavefield,
computing a distance a pressure sensor moved along the vessel track with respect to an initial pressure sensor location;
computing a distance-correction operator based on the distance; and
multiplying a pressure amplitude at the time sample by the distance-correction operator.

20. The medium of claim 17 wherein computing the near-continuous particle motion wavefield in the approximately stationary-receiver locations comprises:
transforming the recorded near-continuous particle motion wavefield from a space-time domain to a wavenumber-time domain;
for each wavenumber sample of the recorded near-continuous particle motion wavefield, and
for each time sample of a trace of the recorded near-continuous particle motion wavefield,
computing the distance a particle motion sensor moved along the vessel track with respect to an initial pressure sensor location;
computing a distance-correction operator based on the distance; and
multiplying a vertical-particle-velocity amplitude at the time sample by the distance-correction operator.

21. The medium of claim 17 wherein computing the near-continuous particle motion wavefield in the approximately stationary-receiver locations comprises:
for each component pressure wavefield of the recorded near-continuous particle motion wavefield in the approximately stationary-receiver locations,
transforming the component particle motion wavefield from a space-time domain to a wavenumber-time domain;
for each wavenumber sample of the recorded near-continuous particle motion wavefield, and
for each time sample of a trace of the recorded near-continuous particle motion wavefield,
computing the distance a particle motion sensor moved along the vessel track with respect to an initial pressure sensor location;
computing a distance-correction operator based on the distance; and
multiplying a vertical-particle-velocity amplitude at the time sample by the distance-correction operator.

22. The medium of claim 17 wherein computing one of the up-going pressure or particle motion wavefield in the approximately stationary-receiver locations comprises:
transforming the recorded near-continuous pressure and particle motion wavefields in the approximately stationary-receiver locations from the wavenumber-time domain to pressure and particle motion wavefields in the wavenumber-frequency domain;

computing an estimated particle motion wavefield over a low-frequency range based on pressure wavefield over the low-frequency range;

combining the estimated particle motion wavefield over the low-frequency range with the particle motion wavefields above to the low-frequency to generate a combined near-continuous particle motion wavefield in approximately stationary-receiver locations; and computing the up-going pressure or particle motion wavefield based on the near-continuous pressure wavefield in the approximately stationary-receiver locations and the combined near-continuous particle motion wavefield in approximately stationary-receiver locations.

* * * * *